US012532032B2

(12) United States Patent
Schwarz et al.

(10) Patent No.: US 12,532,032 B2
(45) Date of Patent: Jan. 20, 2026

(54) CODING CONCEPT FOR A SEQUENCE OF INFORMATION VALUES

(71) Applicant: Fraunhofer-Gesellschaft zur Foerderung der angewandten Forschung e.V., Munich (DE)

(72) Inventors: Heiko Schwarz, Berlin (DE); Anastasia Henkel, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 780 days.

(21) Appl. No.: 17/701,268

(22) Filed: Mar. 22, 2022

(65) Prior Publication Data

US 2022/0217418 A1 Jul. 7, 2022

Related U.S. Application Data

(63) Continuation of application No. PCT/EP2020/076610, filed on Sep. 23, 2020.

(30) Foreign Application Priority Data

Sep. 24, 2019 (EP) ..................... 19199295

(51) Int. Cl.
*H04N 19/91* (2014.01)
*H04N 19/124* (2014.01)
(Continued)

(52) U.S. Cl.
CPC ........... *H04N 19/91* (2014.11); *H04N 19/124* (2014.11); *H04N 19/13* (2014.11); *H04N 19/137* (2014.11); *H04N 19/18* (2014.11)

(58) Field of Classification Search
None
See application file for complete search history.

(56) References Cited

U.S. PATENT DOCUMENTS

2010/0124286 A1* 5/2010 Wang ............... H04N 19/91
375/E7.027
2013/0188704 A1* 7/2013 Zhou ............... H04N 19/119
375/240.12
(Continued)

FOREIGN PATENT DOCUMENTS

CN 107211144 A 9/2017
CN 107333141 A 11/2017
(Continued)

OTHER PUBLICATIONS

EPO, Written Opinion for PCT/EP2020/076610 (Dec. 4, 2020) (Year: 2020).*
(Continued)

*Primary Examiner* — David N Werner
(74) *Attorney, Agent, or Firm* — Perkins Coie LLP; Michael A. Glenn

(57) ABSTRACT

A more effective coding/decoding of a sequence of information values and, for instance, one which enables implementations of increased processing speed, is achieved by rendering the binarization of the information values dependent on previously coded/decoded information values.

42 Claims, 11 Drawing Sheets

(51) Int. Cl.
*H04N 19/13* (2014.01)
*H04N 19/137* (2014.01)
*H04N 19/18* (2014.01)

(56) References Cited

U.S. PATENT DOCUMENTS

| | | | |
|---|---|---|---|
| 2014/0328396 A1* | 11/2014 | Guo | H04N 19/124 |
| | | | 375/240.03 |
| 2016/0227216 A1* | 8/2016 | Cheng | H04N 19/44 |
| 2016/0330479 A1* | 11/2016 | Liu | H04N 19/176 |
| 2016/0366447 A1 | 12/2016 | George et al. | |
| 2018/0309990 A1* | 10/2018 | Alshina | H04N 19/126 |
| 2018/0367810 A1* | 12/2018 | George | H04N 19/174 |
| 2020/0177889 A1* | 6/2020 | Kim | H04N 19/70 |
| 2020/0275099 A1* | 8/2020 | Park | H04N 19/157 |
| 2020/0413092 A1* | 12/2020 | Ray | H04N 19/159 |
| 2021/0203933 A1* | 7/2021 | Rosewarne | H04N 19/60 |
| 2022/0007026 A1* | 1/2022 | Sze | H04N 19/13 |
| 2022/0116608 A1* | 4/2022 | Nam | H04N 19/12 |
| 2022/0150497 A1* | 5/2022 | Nam | H04N 19/70 |
| 2022/0286681 A1* | 9/2022 | Tsukuba | H04N 19/60 |
| 2022/0286691 A1* | 9/2022 | Choi | H04N 19/136 |
| 2022/0295099 A1* | 9/2022 | Zhang | H04N 19/11 |
| 2022/0337811 A1* | 10/2022 | Choi | H04N 19/18 |

FOREIGN PATENT DOCUMENTS

| | | |
|---|---|---|
| CN | 107465926 A | 12/2017 |
| CN | 114731446 A | 7/2022 |
| CN | 114731446 B | 7/2022 |
| WO | 2011100837 A1 | 8/2011 |
| WO | 2011128268 A1 | 10/2011 |
| WO | 2013069246 A1 | 5/2013 |
| WO | 2019027074 A1 | 2/2019 |

OTHER PUBLICATIONS

Bross, Benjamin, et al., "Versatile Video Coding (Draft 6)", Joint Video Experts Teams, doc. JVET-O2001, Jul. 2019, 455 pp.

Chen, Jianle, et al., "[Uploaded in 3 parts] Algorithm description for Versatile Video Coding and Test Model 6 (VTM 6)", No. m49914, (Sep. 10, 2019), 127. MPEG Meeting; Jul. 8, 2019-Jul. 12, 2019; Gothenburg; (Motion Picture Expert Group or ISO/IEC JTC1/SC29/WG11), JVET-O2002-v2.docx, (Sep. 10, 2019), XP030208573 [X], 46 pp.

Nam, Junghak, et al., "CE8-1.3: BVD coding method", No. JVET-O0093, (Jun. 19, 2019), 15. JVET Meeting; Jul. 3, 2019-Jul. 12, 2019; Gothenburg; (The Joint Video Exploration Team of ISO/IEC JTC1/SC29/WG11 and ITU-T SG.16), JVET-O0093.docx, (Jun. 19, 2019), XP030205670 [X], 6 pp.

Schwarz, Heiko, et al., "Non-CE7: State-dependent Binarization for Transform Coefficient Levels", No. JVET-P0619, (Oct. 4, 2019), 16. JVET Meeting; Oct. 1, 2019-Oct. 11, 2019; Geneva; (The Joint Video Exploration Team of ISO/IEC JTC1/SC29/WG11 and ITU-T SG.16), JVET-P0619-v2/JVET-P0619-v2.docx, (Oct. 4, 2019), XP030217872 [XP, 14 pp.

CN107211144 - First Exam Opinion, Jul. 4, 2019.
CN107211144 - Notice Grant, Oct. 9, 2019.
CN114731446 - First Office Action, Feb. 7, 2024.
CN114731446 - Notice Grant, Oct. 22, 2024.

* cited by examiner

```
if( setId[ k ] == 0 ) {
    n = 2 * level[ k ]
} else {
    n = 2 * level[ k ] – sign( level[ k ] )
}
trec[ k ] = n * quant_step_size[ k ]
```

```
n = 2 * level[ k ] – ( setId[ k ] > 0 ? sign( level[ k ] ) : 0 )
trec[ k ] = ( n * scale[ k ] + add ) >> shift
```

```
state = 0
for( k = kstart; k >= 0; k-- )
{
    n = 2 * level[ k ] - ( setId[ state ] > 0 ? sign( level[ k ] ) : 0 )
    trec[ k ] = ( n * scale[ k ] + add ) >> shift
    state = state_trans_table[ state ][ path( level[ k ] ) ]
}
```

```
setId[4] = { 0, 0, 1, 1 }
state_trans_table[4][2] = { {0,2}, {2,0}, {1,3}, {3,1} }
```

```
startScanIdx = ( firstSubblock ? firstSigScanIdx : minSubblockScanIdx )
endScanIdx   = maxSubblockScanIdx // first pass (regular coded bins)
for( k = startScanIdx; k <= endScanIdx; k++ ) {
  coeff[k] = 0
  if( sig_flag cannot be inferred to be equal to 1 ) {
    decode sig_flag[k]
  }
  if( sig_flag[k] != 0 ) {
    decode gt1_flag[k]
    if( gt1_flag[k] != 0 ) {
      decode par_flag[k]
      decode gt3_flag[k]
    }
    coeff[k] = 1 + gt1_flag[k] + par_flag[k] + 2 * gt3_flag[k]
  }
  state = stateTransTable[ state ][ coeff[k] & 1 ]
}

// second pass (bypass coding of remainder)
for( k = startScanIdx; k <= endScanIdx; k++ ) {
  if( gt3_flag[k] != 0 ) {
    decode rem[k]
    coeff[k] = coeff[k] + 2 * rem[k]
  }
}

// third pass (bypass coding of signs)
for( k = startScanIdx; k <= endScanIdx; k++ ) {
  if( coeff[k] != 0 ) {
    decode sign_flag[k]
    if( sign_flag[k] == 1 )
      coeff[k] = -coeff[k]
  }
}
```

Fig. 6b

```
startScanIdx   = ( firstSubblock ? firstSigScanIdx : minSubblockScanIdx )
endScanIdx     = maxSubblockScanIdx
startIdxBypass = ( remRegBins >= 4 ? maxSubblockScanIdx + 1 : startScanIdx )

// first pass (regular coded bins)
for( k = startScanIdx; k <= endScanIdx && remRegBins >= 4; k++ ) {
  coeff[k] = 0
  if( sig_flag cannot be inferred to be equal to 1 ) {
    decode sig_flag[k]
    remRegBins = remRegBins - 1
  }
  if( sig_flag[k] != 0 ) {
    decode gt1_flag[k]
    remRegBins = remRegBins - 1
    if( gt1_flag[k] != 0 ) {
      decode par_flag[k]
      decode gt3_flag[k]
      remRegBins = remRegBins - 2
    }
    coeff[k] = 1 + gt1_flag[k] + par_flag[k] + 2 * gt3_flag[k]
  }
  if( remRegBins < 4 ) {
    startIdxBypass = k + 1
  }
  state = stateTransTable[ state ][ coeff[k] & 1 ]
}

// second pass (bypass coding of remainder)
for( k = startScanIdx; k < startIdxBypass; k++ ) {
  if( gt3_flag[k] != 0 ) {
    decode rem[k]
    coeff[k] = coeff[k] + 2 * rem[k]
  }
}

// third pass (bypass coding of absolute levels)
for( k = startIdxBypass; k <= endScanIdx; k++ ) {
  derive pos0
  decode abs_level[k]
  if( abs_level[k] == pos0 )
    coeff[k] = 0
  else if ( abs_level[k] < pos0 )
    coeff[k] = abs_level[k] + 1
  else
    coeff[k] = abs_level[k]
  state = stateTransTable[ state ][ coeff[k] & 1 ]
}

// fourth pass (bypass coding of signs)
for( k = startScanIdx; k <= endScanIdx; k++ ) {
  if( coeff[k] != 0 ) {
    decode sign_flag[k]
    if( sign_flag[k] == 1 )
      coeff[k] = -coeff[k]
  }
}
```

Fig. 6c

Table 3

| |q| | binarization B1 | | | | | binarization B2 | | | | |
|---|---|---|---|---|---|---|---|---|---|---|
| | sig | gt1 | par | gt3 | rem | eq1 | gt1 | par | gt3 | rem |
| 0 | 0 | - | - | - | - | 0 | 0 | - | - | - |
| 1 | 1 | 0 | - | - | - | 1 | - | - | - | - |
| 2 | 1 | 1 | 0 | 0 | - | 0 | 1 | 0 | 0 | - |
| 3 | 1 | 1 | 1 | 0 | - | 0 | 1 | 1 | 0 | - |
| 4 | 1 | 1 | 0 | 1 | 0 | 0 | 1 | 0 | 1 | 0 |
| 5 | 1 | 1 | 1 | 1 | 0 | 0 | 1 | 1 | 1 | 0 |
| 6 | 1 | 1 | 0 | 1 | 1 | 0 | 1 | 0 | 1 | 1 |
| 7 | 1 | 1 | 1 | 1 | 1 | 0 | 1 | 1 | 1 | 1 |
| 8 | 1 | 1 | 0 | 1 | 2 | 0 | 1 | 0 | 1 | 2 |
| 9 | 1 | 1 | 1 | 1 | 2 | 0 | 1 | 1 | 1 | 2 |
| 10 | 1 | 1 | 0 | 1 | 3 | 0 | 1 | 0 | 1 | 3 |
| 11 | 1 | 1 | 1 | 1 | 3 | 0 | 1 | 1 | 1 | 3 |
| 12 | 1 | 1 | 0 | 1 | 4 | 0 | 1 | 0 | 1 | 4 |
| 13 | 1 | 1 | 1 | 1 | 4 | 0 | 1 | 1 | 1 | 4 |
| 14 | 1 | 1 | 0 | 1 | 5 | 0 | 1 | 0 | 1 | 5 |
| 15 | 1 | 1 | 1 | 1 | 5 | 0 | 1 | 1 | 1 | 5 |
| ... | ... | ... | ... | ... | ... | ... | ... | ... | ... | ... |

Fig. 8

Table 4

| |qI| | sig | gt1 | par | gt3 | rem | eq1 | gt1 | par | gt3 | rem | gt1 | eq1 | par | gt3 | rem |
|---|---|---|---|---|---|---|---|---|---|---|---|---|---|---|---|
| | | binarization B1 | | | | | | binarization B2 | | | | | binarization B3 | | | |
| 0 | 0 | - | - | - | - | 0 | - | - | - | - | 0 | 0 | - | - | - |
| 1 | 1 | 0 | - | - | - | 1 | 0 | - | - | - | 0 | 1 | - | - | - |
| 2 | 1 | 1 | 0 | - | - | 0 | 1 | 0 | - | - | 1 | - | 0 | 0 | - |
| 3 | 1 | 1 | 1 | 0 | - | 0 | 1 | 1 | 0 | - | 1 | - | 1 | 0 | 0 |
| 4 | 1 | 1 | 0 | 1 | 0 | 0 | 1 | 0 | 1 | 0 | 1 | - | 0 | 1 | 0 |
| 5 | 1 | 1 | 1 | 1 | 1 | 0 | 1 | 1 | 1 | 1 | 1 | - | 1 | 1 | 1 |
| 6 | 1 | 1 | 0 | 1 | 2 | 0 | 1 | 0 | 1 | 2 | 1 | - | 0 | 1 | 2 |
| 7 | 1 | 1 | 1 | 1 | 2 | 0 | 1 | 1 | 1 | 2 | 1 | - | 1 | 1 | 2 |
| 8 | 1 | 1 | 0 | 1 | 3 | 0 | 1 | 0 | 1 | 3 | 1 | - | 0 | 1 | 3 |
| 9 | 1 | 1 | 1 | 1 | 3 | 0 | 1 | 1 | 1 | 3 | 1 | - | 1 | 1 | 3 |
| 10 | 1 | 1 | 0 | 1 | 4 | 0 | 1 | 0 | 1 | 4 | 1 | - | 0 | 1 | 4 |
| 11 | 1 | 1 | 1 | 1 | 4 | 0 | 1 | 1 | 1 | 4 | 1 | - | 1 | 1 | 4 |
| 12 | 1 | 1 | 0 | 1 | 5 | 0 | 1 | 0 | 1 | 5 | 1 | - | 0 | 1 | 5 |
| 13 | 1 | 1 | 1 | 1 | 5 | 0 | 1 | 1 | 1 | 5 | 1 | - | 1 | 1 | 5 |
| 14 | 1 | 1 | 0 | 1 | ... | 0 | 1 | 0 | 1 | ... | 1 | - | 0 | 1 | ... |
| 15 | 1 | 1 | 1 | 1 | ... | 0 | 1 | 1 | 1 | ... | 1 | - | 1 | 1 | ... |
| ... | | | | | | | | | | | | | | | |

Fig. 9

```
startScanIdx   = ( firstSubblock ? firstSigScanIdx : minSubblockScanIdx )
endScanIdx     == maxSubblockScanIdx
startIdxBypass = ( remRegBins >= 4 ? maxSubblockScanIdx + 1 : startScanIdx )

// first pass (regular coded bins)                                          ← 46
for( k = startScanIdx; k <= endScanIdx && remRegBins >= 4; k++ ) {
  coeff[k] = 0
  derive variable sumAbs
  if( sumAbs > Thres[ state ] ) {   // Thres[] is a fixed array with 4 entries
    // binarization B2
    decode eq1_flag[k]
    remRegBins = remRegBins - 1
    if( eq1_flag[k] == 1 )
      coeff[k] = 1                                             ← 48
    else {
      if( gt1_flag cannot be inferred to be equal to 1 ) {
        decode gt1_flag[k]  // different contexts than for gt1_flag of binarization B1
        remRegBins = remRegBins - 1
      }
      coeff[k] = 2 * gt1_flag[k]                               ← 48
    }
  } else {
    // binarization B1 (VTM-6 binarization)
    if( sig_flag cannot be inferred to be equal to 1 ) {
      decode sig_flag[k]
      remRegBins = remRegBins - 1
    }
    if( sig_flag[k] != 0 ) {
      decode gt1_flag[k]
      remRegBins = remRegBins - 1
      coeff[k] = 1 + gt1_flag[k]                               ← 48
    }
  }

// common part for both binarizations
  if( gt1_flag[k] != 0 ) {
    decode par_flag[k]
    decode gt3_flag[k]
    remRegBins = remRegBins - 2
    coeff[k] = coeff[k] + par_flag[k] + 2 * gt3_flag[k]        ← 48
  }
  if( remRegBins < 4 )
    startIdxBypass = k + 1
}
state = stateTransTable[ state ][ coeff[k] & 1 ]
// second pass (bypass coding of remainder)                    ← 52
for( k = startScanIdx; k < startIdxBypass; k++ ) {
  if( gt3_flag[k] != 0 ) {
    decode rem[k]
    coeff[k] = coeff[k] + 2 * rem[k]                           ← 58
  }
}
// third pass (bypass coding of absolute levels)               ← 60
for( k = startIdxBypass; k <= endScanIdx; k++ ) {
  derive pos0
  decode abs_level[k]
  if( abs_level[k] == pos0 )
    coeff[k] = 0
  else if ( abs_level[k] < pos0 )
    coeff[k] = abs_level[k] + 1
  else
    coeff[k] = abs_level[k]
  state = stateTransTable[ state ][ coeff[k] & 1 ]
}
// fourth pass (bypass coding of signs)                        ← 54
for( k = startScanIdx; k <= endScanIdx; k++ ) {
  if( coeff[k] != 0 ) {
    decode sign_flag[k]
    if( sign_flag[k] == 1 )
      coeff[k] = -coeff[k]
  }
}
```

Fig. 10

CODING CONCEPT FOR A SEQUENCE OF INFORMATION VALUES

CROSS-REFERENCE TO RELATED APPLICATIONS

This application is a continuation of copending International Application No. PCT/EP2020/076610, filed Sep. 23, 2020, which is incorporated herein by reference in its entirety, and additionally claims priority from European Application No. EP 19 199 295.7, filed Sep. 24, 2019, which is incorporated herein by reference in its entirety.

The present application is concerned with a coding concept for a sequence of information values by use of binarization and arithmetic coding of bins.

BACKGROUND OF THE INVENTION

In many modern codecs such as H.264 and its successor HEVC, context-adaptive arithmetic coding (CABAC) is used to code the data. However, the more efficient this tool becomes, the larger the bin-to-bit ratio turns out to get. As the bin-to-bit ratio specifies the average number of binary decisions (bins) that are decoded for a bit in the bitstream, an increasing bin-to-bit ratio comes along with an increased number of computations to be performed before having decoded a certain number of bits, thereby hampering efforts to obtain increased decoding/coding speeds.

SUMMARY

An embodiment may have an apparatus for decoding a sequence of information values using binary arithmetic decoding, configured to, for a currently decoded information value, select a selected binarization out of a set of binarizations for the currently decoded information value depending on previously decoded information values, and arithmetically decode bins of a bin string of the selected binarization to acquire the currently decoded information value.

Another embodiment may have an apparatus for encoding a sequence of information values using binary arithmetic coding, configured to, for a currently encoded information value, select a selected binarization out of a set of binarizations for the currently encoded information value depending on previously encoded information values, and arithmetically encode bins of a bin string of the currently encoded information value of the selected binarization.

Another embodiment may have a method for decoding a sequence of information values using binary arithmetic decoding, including, for a currently decoded information value, select a selected binarization out of a set of binarizations for the currently decoded information value depending on previously decoded information values, and arithmetically decode bins of a bin string of the selected binarization to acquire the currently decoded information value.

Another embodiment may have a method for encoding a sequence of information values using binary arithmetic coding, including, for a currently encoded information value, select a selected binarization out of a set of binarizations for the currently encoded information value depending on previously encoded information values, and arithmetically encode bins of a bin string of the currently encoded information value of the selected binarization.

Another embodiment may have a data stream encoded by an inventive apparatus or by a method for decoding a sequence of information values using binary arithmetic decoding, including, for a currently decoded information value, select a selected binarization out of a set of binarizations for the currently decoded information value depending on previously decoded information values, and arithmetically decode bins of a bin string of the selected binarization to acquire the currently decoded information value.

A more effective coding/decoding of a sequence of information values and, for instance, one which enables implementations of increased processing speed, is achieved by rendering the binarization of the information values dependent on previously coded/decoded information values.

BRIEF DESCRIPTION OF THE DRAWINGS

Embodiments of the present invention will be detailed subsequently referring to the appended drawings, in which:

FIG. 6*b* shows a simplified pseudo-code specifying the decoding of block or subblock with coded_subblock_flag equal to 1, the example serving as a comparison example for embodiments described herein.

FIG. 6*c* shows a pseudo-code specifying the decoding of block or subblock with coded_subblock_flag equal to 1, the example incurring a bypass mode and the example serving as a comparison example for embodiments described herein.

FIG. 8 shows table 3, namely an example for two different binarizations for information values, here absolute values |q| of transform coefficient levels. The bins xxx_flag (with xxx being replaced by sig, gt1, par, gt3, or eq1) are abbreviated by xxx.

FIG. 9 shows table 4, namely an example for three different binarizations for information values, here absolute values |q| of transform coefficient levels. The bins xxx_flag (with xxx being replaced by sig, gt1, par, gt3, or eq1) are abbreviated by xxx.

FIG. 10 shows a pseudo-code specifying the decoding of subblock with coded_subblock_flag equal to 1 and a context-adaptive binarization, as an example for decoding transform coefficients of a transform block along a scan order as an example of decoding a sequence of information values.

DETAILED DESCRIPTION OF THE INVENTION

Figures 1, 2, 3:
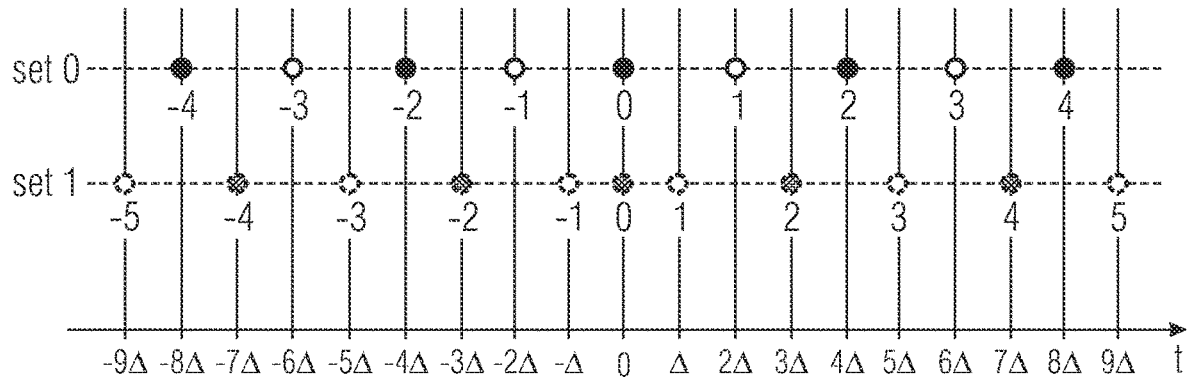
FIG. 1 shows a schematic diagram of an embodiment incurring two sets of reconstruction levels, two information-value-to-reconstruction-level mappings. The hollow and filled circles indicate two different subsets inside the sets of reconstruction levels; the subsets can be used for determining the set of reconstruction levels for the next transform coefficient in reconstruction order.
FIG. 2 shows a pseudo-code illustrating a reconstruction process for transform coefficients, i.e. a way for dequantizing the information values. k represents an index that specifies the reconstruction order, or better dequantization order, of the current transform coefficient, which may coincide with the coding/decoding order of the information values, the quantization index for the current transform coefficient is denoted by level[k], the quantization step size $\Delta_k$ that applies to the current transform coefficient is denoted by quant_step_size[k], and trec[k] represents the value of the reconstructed transform coefficient $t'_k$. The variable setId[k] specifies the set of reconstruction levels that applies to the current transform coefficient. It is determined based on the preceding transform coefficients in reconstruction order; the possible values of setId[k] are 0 and 1. The variable n specifies the integer factor of the quantization step size; it is given by the chosen set of reconstruction levels (i.e., the value of setId[k]) and the transmitted quantization index level[k]. The process shown may be used in the embodiments described herein.
FIG. 3 shows a pseudo-code illustrating an alternative implementation of the pseudo-code of FIG. 2. The main change is that the multiplication with the quantization step is represented using an integer implementation using a scale and a shift parameter. Typically, the shift parameter (represented by shift) is constant for a transform block and only the scale parameter (given by scale[k]) may depend on the location of the transform coefficient. The variable add represents a rounding offset, it is typically set equal to add= (1«(shift−1)). With $\Delta_k$ being the nominal quantization step for the transform coefficient, the parameters shift and scale [k] are chosen in a way that we have $\Delta_k \approx \text{scale}[k] \cdot 2^{-shift}$.

In accordance with the embodiments described next, quantization indices of transform coefficients represent an example for a sequence of information values to be coded, but the application is not restricted to this example. A similar statement is true with respect to the sort of quantization concept used. While the embodiments described below use dependent quantization, the application and modified examples are not restricted that kind of quantization and independent quantization of the information values might be applied as well. That is, the embodiments relate to entropy coding of transform coefficient levels in the context of transform coding with dependent scalar quantization, but modified and advantageous embodiments might derived therefrom, such as by leaving of the transform and applying the concept to quantization indexes for sample values of a block of sample values, traversed along a scan order, and/or components of motion vector differences, and/or by leaving of the dependent quantization and using independent quantization instead. A similar statement is true with respect to the fact that subsequently explained embodiments relate to the case where the information values represent a prediction residual of a picture block such as for video or picture coding, but even this is not mandatory and the prediction may be left off and the coding concept present herein be applied to a signal such as a picture directly without prediction. As will be outlined in more detail below, a context-dependent binarization of the information values such as transform coefficient levels is used so as to improve efficiency in at least some embodiments.

Some embodiments described below apply to lossy coding of a block of residual samples. The residual samples represent the difference between the original block of samples and the samples of a prediction signal (the prediction signal can be obtained by intra-picture prediction or inter-picture prediction, or a combination of intra- and inter-picture prediction, or any other means; in a special case the prediction signal could be set equal to zero).

Some embodiments described below apply relate to transform residual coding. Thus, the residual block of samples may be transformed using a signal transform. Typically, a linear and separable transform is used (linear means that the transforms are linear, but may incorporate an additional rounding of transform coefficients). Often an integer approximation of the DCT-II or an integer approximation of other transforms of the DCT/DST family is used. Different transforms may be used in horizontal or vertical direction. The transform is not restricted to linear and separable transforms. Any other transform (linear and non-separable, or non-linear) may be used. In particular, a second order non-separable transform may be applied to (a part of) the transform coefficients obtained after a first separable transform. As result of the signal transform, a block of transform coefficients is obtained that represents the original block of residual samples in a different signal space. In a special case, the transform can be equal to the identify transform (i.e., the block of transform coefficients can be equal to the block of residual samples). The block of transform coefficients is coded using lossy coding. At the decoder side, the block of reconstructed transform coefficients is inverse transformed so that a reconstructed block of residual samples is obtained. And finally, by adding the prediction signal, a reconstructed block of image samples is obtained.

That is, below, concepts for lossy coding of a block of transform coefficients, and, particularly, concepts for entropy coding of transform coefficient levels for dependent quantization are presented.

In this context, dependent quantization refers to a quantization methods with the following properties: At the encoder side, the block of transform coefficients is mapped to a block of transform coefficient levels (i.e., quantization indexes), which represent the transform coefficients with reduced fidelity. At the decoder side, the quantization indexes are mapped to reconstructed transform coefficients (which differ from the original transform coefficients due to quantization). In contrast to conventional or independent scalar quantization, the transform coefficients are not independently quantized. Instead, the admissible set of reconstruction levels for a certain transform coefficient depends on the chosen quantization indexes for other transform coefficients.

The transform coefficient levels representing reconstructed transform coefficients (for dependent scalar quantization) are entropy coded using binary arithmetic coding. Therefore, the transform coefficient levels are mapped to a sequence of binary decisions (also referred to as bins). This part is referred to as binarization. The binary decisions are then coded using binary arithmetic coding. Two coding modes for the bins are distinguished. In the first mode, the regular coding mode, each bin is coded using an adaptive binary probability model (also referred to as context). The process of selecting a suitable context is referred to as context modelling. In the second mode, the bypass mode, a bin is coded using a non-adaptive binary probability model at equi-probability, i.e. with a probability mass function of (0.5, 0.5).

Thus, embodiments for binarization and context modelling of transform coefficient levels for dependent quantization are described below. Before going into details, however, a rough overview of reference concepts for coding transform coefficient levels is provided against which the concepts described herein form an improvement.

In the following, at least with respect to some embodiments, a concept of dependent quantization and entropy coding of transform coefficient levels is described which is based on the draft 6 for the Versatile Video Coding standard (VTM-6). Accordingly, some technical concepts anticipated to be used in VVC or forming a starting point for the present embodiments are described below. It should, however, noted that the presentation of all the details concerning the reference framework formed by the current status of the development VVC does not mean that embodiments of the present application would be restricted to the framework of VVC and that the embodiments of the present application described afterwards may be transferred onto other codec environments.

Dependent quantization of transform coefficients refers to a concept in which the set of available reconstruction levels for a transform coefficient depends on the chosen quantization indexes for preceding transform coefficients in reconstruction order (inside the same transform block). Multiple sets of reconstruction levels are pre-defined and, based on the quantization indexes for preceding transform coefficients in coding order, one of the predefined sets is selected for reconstructing the current transform coefficient.

The set of admissible reconstruction levels for a current transform coefficient is selected (based on the quantization indexes for preceding transform coefficients in coding order) among a collection (two or more sets) of pre-defined sets of reconstruction levels. The values of the reconstruction levels of the sets of reconstruction levels are parameterized by a block-based quantization parameter. The block-based quantization parameter (QP) determines a quantization step size $\Delta$ and all reconstruction levels (in all sets of reconstruction levels) represent integer multiples of the quantization step size $\Delta$. The quantization step size $\Delta_k$ for a particular transform coefficient $t_k$ (with k indicating the reconstruction order) may not be solely determined by the block quantization parameter QP, but it is also possible that the quantization step size $\Delta_k$ for a particular transform coefficient $t_k$ is determined by a quantization weighting matrix and the block quantization parameter. Typically, the quantization step size $\Delta_k$ for a transform coefficient $t_k$ is given by the product of the weighting factor $w_k$ for the transform coefficient $t_k$ (specified by the quantization weighting matrix) and the block quantization step size $\Delta_{block}$ (specified by the block quantization parameter), $$\Delta_k = w_k \cdot \Delta_{block}.$$

In VTM-6, the dependent scalar quantization for transform coefficients uses exactly two different sets of reconstruction levels. All reconstruction levels of the two sets for a transform coefficient $t_k$ represent integer multiples of the quantization step size $\Delta_k$ for this transform coefficient (which is, at least partly, determined by a block-based quantization parameter). Note that the quantization step size $\Delta_k$ just represents a scaling factor for the admissible reconstruction values in both sets. Except of a possible individual quantization step size $\Delta_k$ for the different transform coefficients $t_k$ inside a transform block (and, thus, an individual scaling factor), the same two sets of reconstruction levels are used for all transform coefficients.

The two sets of reconstruction levels are shown in FIG. 1:

The reconstruction levels that are contained in the first quantization set (labeled as set 0 in the figure) represent the even integer multiples of the quantization step size. The second quantization set (labeled as set 1 in the figure) contains all odd integer multiples of the quantization step size and additionally the reconstruction level equal to zero.

Note that both reconstruction sets are symmetric about zero. The reconstruction level equal to zero is contained in both reconstruction sets, otherwise the reconstruction sets are disjoint. The union of both reconstruction sets contains all integer multiples of the quantization step size.

The reconstruction level that the encoder selects among the admissible reconstruction levels have to be indicated inside the bitstream. As in conventional independent scalar quantization, this can be achieved using so-called quantization indexes, which are also referred to as transform coefficient levels. Quantization indexes (or transform coefficient levels) are integer numbers that uniquely identify the available reconstruction levels inside a quantization set (i.e., inside a set of reconstruction levels). The quantization indexes are sent to the decoder as part of the bitstream (using any entropy coding technique). At the decoder side, the reconstructed transform coefficients can be uniquely calculated based on a current set of reconstruction levels (which is determined by the preceding quantization indexes in coding/reconstruction order) and the transmitted quantization index for the current transform coefficient.

The reconstruction levels in FIG. 1 are labeled with an associated quantization index (the quantization indexes are given by the numbers below the circles that represent the reconstruction levels). The quantization index equal to 0 is assigned to the reconstruction level equal to 0. The quantization index equal to 1 is assigned to the smallest reconstruction level greater than 0, the quantization index equal to 2 is assigned to the next reconstruction level greater than 0 (i.e., the second smallest reconstruction level greater than 0), etc. Or, in other words, the reconstruction levels greater than 0 are labeled with integer numbers greater than 0 (i.e., with 1, 2, 3, etc.) in increasing order of their values. Similarly, the quantization index −1 is assigned to the largest reconstruction level smaller than 0, the quantization index −2 is assigned to the next (i.e., the second largest) reconstruction level smaller than 0, etc. Or, in other words, the reconstruction levels smaller than 0 are labeled with integer numbers less than 0 (i.e., −1, −2, −3, etc.) in decreasing order of their values.

The usage of reconstruction levels that represent integer multiples of a quantization step sizes allow computationally low complex algorithms for the reconstruction of transform coefficients at the decoder side. This is illustrated based on the example of FIG. 1 in the following. The first quantization set includes all even integer multiples of the quantization step size and the second quantization set includes all odd integer multiples of the quantization step size plus the reconstruction level equal to 0 (which is contained in both quantization sets). The reconstruction process for a transform coefficient could be implemented similar to the algorithm specified in the pseudo-code of FIG. 2.

In the pseudo-code of FIG. 2, level[k] denotes the quantization index that is transmitted for a transform coefficient $t_k$ and setId[k] (being equal to 0 or 1) specifies the identifier of the current set of reconstruction levels (it is determined based on preceding quantization indexes in reconstruction order as will be described in more detail below). The variable n represents the integer multiple of the quantization step size given by the quantization index level[k] and the set identifier setId[k]. If the transform coefficient is coded using the first set of reconstruction levels (setId[k]==0), which contains the even integer multiples of the quantization step size $\Delta_k$, the variable n is two times the transmitted quantization index. If the transform coefficient is coded using the second set of reconstruction levels (setId[k]==1), we have the following three cases: (a) if level[k] is equal to 0, n is also equal to 0; (b) if level[k] is greater than 0, n is equal to two times the quantization index level[k] minus 1; and (c) if level[k] is less than 0, n is equal to two times the quantization index level[k] plus 1. This can be specified using the sign function $$\text{sign}(x) = \begin{cases} 1: & x > 0 \\ 0: & x = 0 \\ -1: & x < 0 \end{cases}.$$

Then, if the second quantization set is used, the variable n is equal to two times the quantization index level[k] minus the sign function sign(level[k]) of the quantization index. Once the variable n (specifying the integer factor of the quantization step size) is determined, the reconstructed transform coefficient $t'_k$ is obtained by multiplying n with the quantization step size $\Delta_k$.

As mentioned above, instead of an exact multiplication with the quantization step size $\Delta_k$, the reconstructed transform coefficient $t'_k$ can be obtained by an integer approximation. This is illustrated in the pseudo-code in FIG. 3. Here, the variable shift represents a bit shift to the right. Its value typically depends only on the quantization parameter for the block (but it is also possible that the shift parameter can be changed for different transform coefficients inside a block). The variable scale[k] represents a scaling factor for the transform coefficient $t_k$; in addition to the block quantization parameter, it can, for example, depend on the corresponding entry of the quantization weighting matrix. The variable add specifies a rounding offset, it is typically set equal to add=(1<<(shift−1)). It should be noted that the integer arithmetic specified in the pseudo-code of FIG. 3 (last line) is, with exception of the rounding, equivalent to a multiplication with a quantization step size $\Delta_k$, given by $$\Delta_k = \text{scale}[k] \cdot 2^{-\text{shift}}.$$

Another (purely cosmetic) change in FIG. 3 relative to FIG. 2 is that the switch between the two sets of reconstruction levels is implemented using the ternary if-then-else operator (a?b:c), which is known from programming languages such as the C programming language.

Another important design aspect of dependent scalar quantization is the algorithm used for switching between the defined quantization sets (sets of reconstruction levels). The used algorithm determines the "packing density" that can be achieved in the N-dimensional space of transform coefficients (and, thus, also in the N-dimensional space of reconstructed samples). A higher packing density eventually results in an increased coding efficiency.

In VTM-6, the transition between the quantization sets (set 0 and set 1) is determined by a state variable. For the first transform coefficient in reconstruction order, the state variable is set equal to a pre-defined value. Typically, the pre-defined value is equal to 0. The state variable for the following transform coefficients in coding order are determined by an update process. The state for a particular transform coefficient only depends on the state for the previous transform coefficient in reconstruction order and the value of the previous transform coefficient.

The state variable has four possible values (0, 1, 2, 3). On the one hand, the state variable specifies the quantization set that is used for the current transform coefficient. The quantization set 0 is used if and only if the state variable is equal to 0 or 1, and the quantization set 1 is used if and only if the state variable is equal to 2 or 3. On the other hand, the state variable also specifies the possible transitions between the quantization sets.

The state for a particular transform coefficient only depends on the state for the previous transform coefficient in reconstruction order and a binary function of the value of the previous transform coefficient. The binary function is referred to as path in the following. In VTM-6, the following state transition table is used, where "path" refers to the said binary function of the previous transform coefficient level in reconstruction order.

TABLE 1

State transition table in VTM-6.

| current state | quantization set for current coefficient | next state path 0 | next state path 1 |
|---|---|---|---|
| 0 | 0 | 0 | 2 |
| 1 | 0 | 2 | 0 |
| 2 | 1 | 1 | 3 |
| 3 | 1 | 3 | 1 |

In VTM-6, the path is given by the parity of the quantization index. With level[k] being the transform coefficient level, it can be determined according to $$\text{path} = (\text{level}[k] \,\&\, 1),$$

where the operator & represents a bit-wise "and" in two-complement integer arithmetic.

As an alternative, the path could also represent other binary functions of level[k]. As an example, it can specify whether a transform coefficient level is equal or not equal to 0:

$$\text{path} = \begin{cases} 0: & \text{level}[k] == 0 \\ 1: & \text{level}[k] \neq 0 \end{cases}.$$

The concept of state transition for the dependent scalar quantization allows low-complexity implementations for the reconstruction of transform coefficients in a decoder. An example for the reconstruction process of transform coefficients of a single transform block is shown in FIG. 4 using C-style pseudo-code.

Figures 4, 5, 6A:
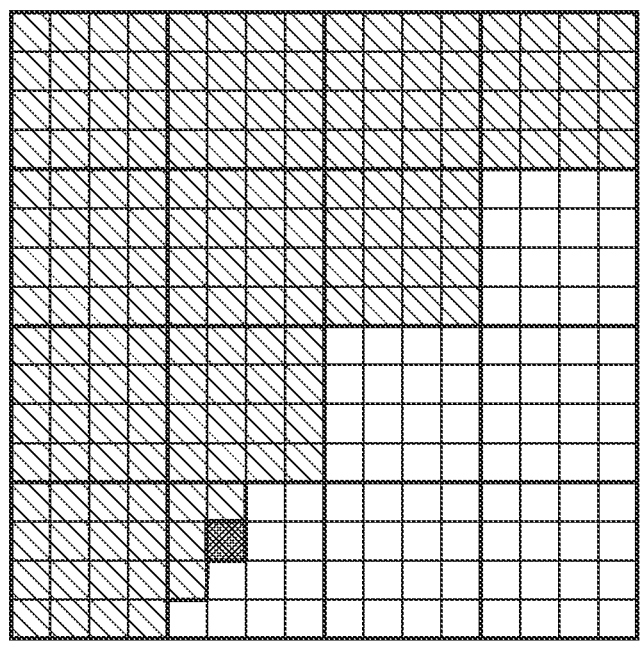
FIG. 4 shows a pseudo-code illustrating a reconstruction process of transform coefficients for a transform block, i.e. a way for dequantizing the information values, here using dependent quantization. The array level represents the transmitted transform coefficient levels (quantization indexes) for the transform block and the array trec represent the corresponding reconstructed transform coefficients. The 2d table state_trans_table specifies the state transition table and the table setId specifies the quantization set that is associated with the states. The function path( ) specifies a binary function of the transform coefficient level. The process shown may be used in the embodiments described herein with mutual influences being discussed herein as well.
FIG. 5 shows examples for a state transition table state_trans_table and the table setId, which specifies the quantization set associated with the states. The table given in C-style syntax represents the tables specified in table 1.
FIG. 6*a* shows a schematic diagram of a transform coefficient block in order to illustrate the signaling of the position of the first non-zero quantization index in coding/decoding/scan order (black sample). In addition to the position of the first non-zero transform coefficients, only bins for the hashed-marked coefficients are transmitted, the white-marked coefficients are inferred to be equal to 0. The concept may be built into embodiments described herein.

In the pseudo-code of FIG. 4, the index k specifies the reconstruction order of transform coefficients. It should be noted that, in the example code, the index k decreases in reconstruction order. The last transform coefficient has the index equal to k=0. The first index kstart specifies the reconstruction index (or, more accurately, the inverse reconstruction index) of the first reconstructed transform coefficient. The variable kstart may be set equal to the number of transform coefficients in the transform block minus 1, or it may be set equal to the index of the first non-zero quantization index (for example, if the location of the first non-zero quantization index is transmitted in the applied entropy coding method) in coding/reconstruction order. In the latter case, all preceding transform coefficients (with indexes k>kstart) are inferred to be equal to 0. The reconstruction process for each single transform coefficient is the same as in the example of FIG. 3. As for the example in FIG. 3, the quantization indexes are represent by level[k] and the associated reconstructed transform are represented by trec[k]. The state variable is represented by state. The 1d table setId[ ] specifies the quantization sets that are associated with the different values of the state variable and the 2d table state_trans_table[ ][ ] specifies the state transition given the current state (first argument) and the path (second argument). As an example, the path could be given by the parity of the quantization index (using the bit-wise and operator &), but other concepts are possible. As a further example, the path could specified whether the transform coefficient is equal or unequal to zero. Examples, in C-style syntax, for the tables are given in FIG. 5 (these tables are identical to Table 1).

Instead of using a table state_trans_table[ ][ ] for determining the next state, an arithmetic operation yielding the same result can be used. Similarly, the table setId[ ] could also be implemented using an arithmetic operation. Or the combination of the table look-up using the 1d table setId[ ] and the sign function could be implemented using an arithmetic operation.

Let's turn to the entropy coding of transform coefficient levels. The main aspect of dependent scalar quantization is that there are different sets of admissible reconstruction levels (also called quantization sets) for the transform coefficients. The quantization set for a current transform coefficient is determined based on the values of the quantization index for preceding transform coefficients. If we consider the example in FIG. 1 and compare the two quantization sets, it is obvious that the distance between the reconstruction level equal to zero and the neighboring reconstruction levels is larger in set 0 than in set 1. Hence, the probability that a quantization index is equal to 0 is larger if set 0 is used and it is smaller if set 1 is used. In VTM-6, this effect is exploited in the entropy coding by switching probability models based on the states that are used for a current quantization index.

Note that for a suitable switching of codeword tables or probability models, the path (binary function of the quantization index) of all preceding quantization indexes may be known when entropy decoding a current quantization index (or a corresponding binary decision of a current quantization index).

In VTM-6, the quantization indexes are coded using binary arithmetic coding similar to H.264|MPEG-4 AVC or H.265|MPEG-H HEVC. For that purpose, the non-binary quantization indexes are first mapped onto a series of binary decisions (which are commonly referred to as bins).

The quantization indexes are transmitted as absolute value and, for absolute values greater than 0, a sign. While the sign is transmitted as single bin, there are many possibilities for mapping the absolute values onto a series of binary decisions.

TABLE 2

Binarization of absolute values |q| of transform coefficient levels in VTM-6.

| |q| | sig_flag | gt1_flag | par_flag | gt3_flag | rem |
|---|---|---|---|---|---|
| 0 | 0 | — | — | — | — |
| 1 | 1 | 0 | — | — | — |
| 2 | 1 | 1 | 0 | 0 | — |
| 3 | 1 | 1 | 1 | 0 | — |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| 12 | 1 | 1 | 0 | 1 | 4 |
| 13 | 1 | 1 | 1 | 1 | 4 |
| 14 | 1 | 1 | 0 | 1 | 5 |
| 15 | 1 | 1 | 1 | 1 | 5 |
| ... | ... | ... | ... | ... | ... |

The binarization of absolute values used in VTM-6 is illustrated in Table 2. The following binary and non-binary syntax elements are transmitted:
sig_flag specifies whether the absolute value |q| of the transform coefficient level is greater than 0;
if sig_flag is equal to 1, gt1_flag specifies whether the absolute value |q| of the transform coefficient level is greater than 1;
if gt1_flag is equal to 1, par_flag specifies the parity of the absolute value |q| of the transform coefficient level, and gt3_flag specifies whether the absolute value |q| of the transform coefficient level is greater than 3;
if gt3_flag is equal to 1, the non-binary value rem specifies the remainder of the absolute level |q|. This syntax element is transmitted in bypass mode of the arithmetic coding engine, using a Golomb rice code.

Not present syntax elements are inferred to be equal to 0. At the decoder side the absolute value of the transform coefficient levels is reconstructed as follows:

$$|q| = sig\_\text{flag} + gt1\_\text{flag} + par\_\text{flag} + 2*(gt3\_\text{flag} + \text{rem})$$

For non-zero transform coefficient levels (indicated by sig_flag equal to 1), a sign_flag specifying the sign of the transform coefficient level is additionally transmitted in bypass mode.

Another detail which influences transform coefficient coding, relates to the coding order of bins and the usage of bypass mode. The entropy of transform coefficient levels in VTM-6 shares several aspects with that of HEVC. But it also includes additional aspects by which the entropy coding is adapted to dependent quantization.

Each block of transform coefficients is partitioned into fixed-size subblocks (also called coefficient groups). In general, the subblocks have a size of 4×4 coefficients (see FIG. 6a). In some cases, other sizes may be used (e.g., 2×2, 2×4, 4×2, 2×8, or 8×2).

Similar to HEVC, the coding of a block of transform coefficients proceeds as follows:

First, a so-called coded_block_flag is transmitted which specifies whether there are any non-zero transform coefficient levels in the transform block. If coded_block_flag is equal to 0, all transform coefficient levels are equal to 0, and no further data is transmitted for the transform block. In some cases (e.g. in the Skip mode), the coded_block_flag may not be explicitly transmitted, but is inferred based on other syntax elements.

If coded_block_flag is equal to 1, the x and y coordinate of the first significant transform coefficient in coding order is transmitted (this is sometimes referred as last significant coefficient, since the actual scanning order specifies a scanning from high-frequency to low frequency components);

The scanning of transform coefficients proceeds on the basis of subblocks (typically, 4×4 subblocks); all transform coefficient levels of a subblock are coded before any transform coefficient level of any other subblock is coded; the subblocks are processed in a pre-defined scanning order, starting with the subblock that contains the first significant coefficient in scanning order and ending with the subblock that contains the DC coefficient;

The syntax includes a coded_subblock_flag, which indicates whether the subblock contains any non-zero transform coefficient levels; for the first and last subblock in scanning order (i.e., the subblock that contains the first significant coefficient in scanning order and the subblock that contains the DC coefficient), this flag is not transmitted, but inferred to be equal to 1; when the coded_subblock_flag is transmitted, it is typically transmitted at the start of a subblock;

For each subblock with coded_subblock_flag equal to 1, the transform coefficient levels are transmitted in multiple scan passes over the scanning positions of a subblock.

In the following, we will initially neglect a special aspect (which will be described later). Without that special aspect, the coding of subblocks with coded_subblock_flag equal to 1 proceeds as follows:

For the first subblock in coding order (i.e., the subblock that includes the first significant scanning position, for which the x and y coordinate are explicitly transmitted), the coding starts at the scan position firstSigScanIdx of the first non-zero coefficient in scanning order (i.e., the scan position that corresponds to the explicitly transmitted x and y coordinate). For all other subblocks, the coding starts at the minimum scan index minSubblockScanIdx inside the subblock. The scan ends at the maximum scan index maxSubblockScanIdx inside the subblock.

In the first pass, the regular coded bins sig_flag, gt1_flag, par_flag, and gt3_flag are transmitted:

The sig_flag is not transmitted if it can be inferred to be equal to 1. It can be inferred to be equal to zero in the following two cases:
(1) The current scan position is equal to the scan index startScanIdx of the first non-zero coefficient in scanning order (i.e., the scan position that corresponds to the explicitly transmitted x and y coordinate);
(2) The current subblock is a subblock for which a coded_subblock_flag equal to 1 was transmitted, the current scan index is the maximum scan index maxSubblockScanIdx inside the subblock, and all previously transmitted sig_flag's for the current subblock are equal to 1.

If sig_flag[k] for a scan index k is equal to 1 (transmitted or inferred), a gt1_flag is transmitted. Otherwise, gt1_flag is inferred to be equal to zero.

If gt1_flag[k] for a scan index k is equal to 1, a par_flag and a gt3_flag are transmitted. Otherwise, the par_flag and the gt3_flag are inferred to be equal to zero.

In the second pass, the remainder values rem are coded for those scan indexes, for which gt3_flag equal to 1 was transmitted. For all other scan indexes, the remainder rem is inferred to be equal to 0. The remainder values rem are coded using a concatenation of a Rice code and exponential Golomb code, which is parameterized by a so-called Rice parameter. The bins of the corresponding codewords are coded in bypass mode. The Rice parameter is determined based on already coded syntax elements (see below).

Finally, in the last pass, for all scan indexes k with sig_flag[k] equal to 1 (coded or inferred), a sign_flag is transmitted, which specifies whether the transform coefficient value is negative or positive.

The following pseudo code further illustrates the coding process for the transform coefficient levels inside a subblock. It is illustrated from a decoder perspective. The Boolean variable firstSubblock specifies whether the current subblock is the first subblock in coding order (inside the transform block). The firstSigScanIdx specifies the scan index that corresponds to the position of the first significant transform coefficient in the transform block (the one that is explicitly signaled at the start of the transform block syntax). minSubblockScanIdx and maxSubblockScanIdx represent the minimum and maximum values of the scan indexes for the current subblock. Note that the first scan index for which any data is transmitted depends on whether the subblock includes the first significant coefficient in scanning order. If this is the case, the first scan pass starts at the scan index that corresponds to the first significant transform coefficient; otherwise, the first scan pass starts at the minimum scan index of the subblock. The variable coeff[k] for a scan index k represents the reconstructed transform coefficient level. The encoding proceeds analog to the decoding.

A pseudo-code specifying the decoding of subblock with coded_subblock_flag equal to 1 in a simplified manner is shown in FIG. 6b.

One disadvantage relative the HEVC was that the maximum number of regular coded bins per transform coefficient is increased. In order to circumvent this issue, the following concept is included in VTM-6:

The maximum number of regular coded bins maxNumRegBins is set equal to $$maxNumRegBins = 1.75 * width * height,$$

where width and height represent the size of the transform block (more accurately, of the non-zero out region of the transform block, in cases in which transform coefficients are forced to be equal to zero).

At the start of the transform block, a counter remRegBins, which specifies the available number of regular coded bins is set equal to remRegBins=maxNumRegBins.

After a regular coded bin is encoded or decoded, the counter remRegBins is decreased by one.

If, at the beginning of the coding for a scan position in the first pass, the counter is less than 4 (in which case, not all bins sig_flag, gt1_flag, par_flag and gt3_flag could be transmitted without exceeding the maximum number of regular coded bins), the first pass is terminated. In addition, the remainder values are only transmitted for such scan position that were included in the first pass.

The absolute levels for which no data is coded in the first scan pass are completely coded in bypass mode. They are coded using the same class of codes as for the remainder rem. The Rice parameter as well as a variable pos0 are determined based on already coded syntax elements (see below). These absolutes levels |q| are not directly coded, but they are first mapped to syntax elements abs_level, which are then coded using the parametric codes.

The mapping of an absolute value |q| to the syntax element abs_level depends on a variable pos0. It is specified by $$\text{abs\_level} = \bigl(|q| == 0 \text{ ? } pos0 : (|q| < pos0 \text{ ? } |q| - 1 : |q|)\bigr)$$

At the decoder side, the mapping of the syntax element abs_level to the absolute value |q| is specified as follows $$|q| = \\ \bigl(\text{abs\_level} == pos0 \text{ ? } 0 : (\text{abs\_level} < pos0 \text{ ? } \text{abs\_level} + 1 : \text{abs\_level})\bigr)$$

It should be noted that limit on the number of regular coded bins is applied on transform block basis and not on a subblock basis. That means, the counter remRegBins is initialized at the beginning of a transform block and decreased for each regular coded bin. If the coding switches to the bypass mode in a particular subblock, all transform coefficient levels of all following subblocks in coding order are also coded in bypass mode.

The coding process for a subblock (with coded_subblock_flag equal to 1) is illustrated in the following pseudo code. As in the previous pseudo-code, the coding process is illustrated from a decoder perspective. For the first coded subblock, the initial value of the counter remRegBins is equal to maxNumRegBins. For all following subblocks, the initial value of the counter remRegBins is equal to the value that was obtained at the end of the previous coded subblock. The scan index startIdxBypass is the first scan index at which the bypass coding (i.e., the coding of abs_level) starts inside the subblock (if applicable).

A pseudo-code specifying the decoding of subblock with coded_subblock_flag equal to 1 with bypass mode is shown in FIG. 6c.

As far as context modeling is concerned, the following holds true. For the regular coded bins sig_flag, gt1_flag, par_flag, and gt3_flag one of multiple probability models (or contexts) is selected for the actual coding.

For the significance flag, the selected probability model depends on the following:

whether the current transform block is a luma or chroma transform block;

the state for dependent quantization;

the x and y coordinate of the current transform coefficient;

the partially reconstructed absolute values (after the first pass) in a local neighborhood.

In the following, more details are given.

The variable state represents the state for a current transform coefficient used in dependent quantization. The state can take the values 0, 1, 2, or 3. Initially, the state is set equal to 0. as explained above, the state for a current transform coefficient is given by the state for the previous coefficient in coding order and the parity (or, more general, a binary function) of the previous transform coefficient level.

With x and y being the coordinates of a current transform coefficient inside the transform block, let $$\text{diag} = x + y$$

be diagonal position of the current coefficient. Given the diagonal position, a diagonal class index dsig is derived as follows:

$$dsig = \bigl(\text{diag} < 2 \text{ ? } 2 : (\text{diag} < 5 \text{ ? } 1 : 0)\bigr) \text{ for luma transform blocks}$$

and $$dsig = \bigl(\text{diag} < 2 \text{ ? } 1 : 0\bigr) \text{ for chroma transform blocks}$$

The ternary operator (c?a:b) represents an if-then-else statement. If the conditions c is true, the value of a is used, otherwise (c is false), the value b is used.

Figure 7:
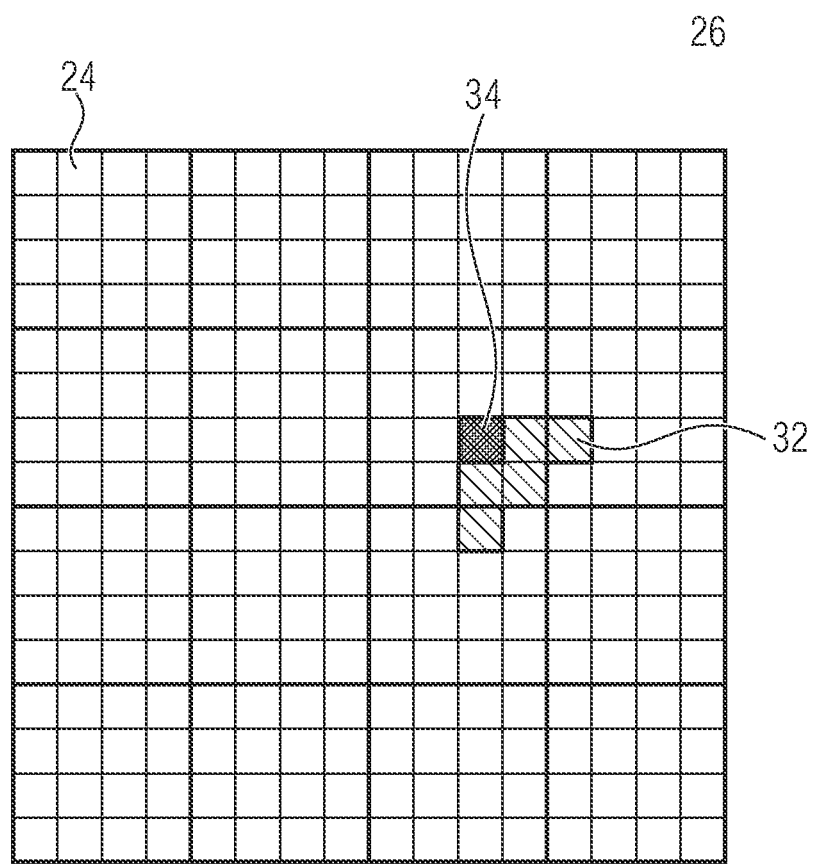
FIG. 7 shows a schematic diagram of a transform coefficient block along with a local template used for selecting probability models for one or more bins. The black square represents the current scan position and the blue square represent the neighboring scan positions inside the template. As described, such a template, the same or a differently shaped one, may be used for binarization selection purposes.

The context also depends on the partially reconstructed absolute values inside a local neighborhood. In VTM-6, the local neighborhood is given by the template T shown in FIG. 7. But other templates are possible. The template used could also depend on whether a luma or a chroma block is coded. Let sumAbs be the sum of partially reconstructed absolute values (after the first pass) in the template T:

$$\text{sumAbs} = \sum_{k \in T} \text{abs1}[k],$$

where abs1[k] represents the partially reconstructed absolute level for a scan index k after the first pass. With the binarization of VTM-6, it is given by $$\text{abs1}[k] = sig\_\text{flag}[k] + gt1\_\text{flag}[k] + par\_\text{flag}[k] + 2 * gt3\_\text{flag}[k].$$

Note that abs1[k] is equal to the value coeff[k] obtained after the first scan pass (see above).

Let us assume that the possible probability models for the sig_flag are organized in a 1d array. And let ctxIdSig be an index that identifies the probability model used. According to VTM-6, the context index ctxIdSig could be derived as follows:

If the transform block is a luma block, $$ctxIdSig = \min((sumAbs + 1) \gg 1, 3) + 4 * dsig + 12 * \min(state - 1, 0)$$

If the transform block is a chroma block, $$ctxIdSig = 36 + \min((sumAbs + 1) \gg 1, 3) + 4 * dsig + 8 * \min(state - 1, 0)$$

Here, the operator ">>" represents a bit shift to the right (in two-complement arithmetic). The operation is identical to a division by two and a downrounding (to the next integer) of the result.

Note that other organizations of the context models are possible. But in any case, the probability model chosen for coding a sig_flag depends on
- whether a luma or a chroma block is coded;
- the state variable, specifically min(state−1, 0);
- the diagonal class dsig;
- the sum of partially reconstructed absolute values (after the first pass) inside the local template, specifically min((sumAbs+1)»1, 3).

For the flags gt1_flag, par_flag, and gt3_flag, the selected probability model depends on the following:
- whether the current transform block is a luma or chroma transform block;
- whether the current transform coefficient is the first non-zero coefficient in coding order inside the transform block;
- the x and y coordinate of the current transform coefficient;
- the partially reconstructed absolute values (after the first pass) in a local neighborhood.

Let firstCoeff be a variable that indicates whether the current scan index represents the scan index of the first non-zero transform coefficient level in coding order (i.e., the scan index or which the x and y location are explicitly coded). If the current scan index is equal to the scan index of the first non-zero transform coefficient level, firstCoeff is equal to 1; otherwise, firstCoeff is equal to 0.

With x and y being the coordinates of a current transform coefficient inside the transform block, let $$diag = x + y$$

be diagonal position of the current coefficient. Given the diagonal position, a diagonal class index dclass is derived as follows:

$$dclass = (diag == 0\ ?\ 3 : (diag < 3\ ?\ 2 : (diag < 10\ ?\ 1 : 0))$$

for luma transform blocks and $$dclass = (diag == 0\ ?\ 1 : 0)\ \text{for chroma transform blocks}$$

The context also depends on the partially reconstructed absolute values inside a local neighborhood. The variable sumAbs is derived as specified above. In addition, a variable numSig is derived, which specifies the number of non-zero transform coefficient levels inside the template T:

$$numSig = \sum_{k \in T} \text{sig\_flag}[k].$$

Similar as for the sig_flag, let us assume that the possible probability models are organized in a 1d array. And let ctxId be an index that identifies the probability model used. According to VTM-6, the context index ctxId could be derived as follows:

If the transform block is a luma block, $$ctxId = (\text{firstCoeff}\ ?\ 0 : 1 + \min(sumAbs - numSig, 4) + 5 * dclass)$$

If the transform block is a chroma block, $$ctxId = 21 + (\text{firstCoeff}\ ?\ 0 : 1 + \min(sumAbs - numSig, 4) + 5 * dclass)$$

Note that other organizations of the context models are possible. But in any case, the probability model chosen depends on
- whether a luma or a chroma block is coded;
- whether the current scan index is the scan index of the first non-zero transform coefficient level in coding order;
- the diagonal class dclass;
- the difference of the sum of partially reconstructed absolute values (after the first pass) inside the local template and the number of non-zero transform coefficient levels inside the local template, specifically min(sumAbs-numSig, 4).

It should be noted that the same context index ctxId is used for gt1_flag, par_flag, and gt3_flag. But for each of these flags, a different set of context models is used.

Both the remainder rem and the absolute values abs_level are coded using a parametric class of codes, for which the bins are coded in bypass mode (see above). The binarization actually used is determined by a so-called Rice parameter RP. Furthermore, for the absolute levels abs_level, a variable pos0 determines the mapping from the coded syntax element abs_level to the actual absolute values.

The Rice parameter for the remainder RPrem is derived based on the sum of reconstructed absolute values in a local template. In VTM-6, the same template as specified above is used. With T representing the template and coeff[k] representing the reconstructed coefficients for a scan index k, the sum sumAbs is derived according to $$sumAbs = \sum_{k \in T} \text{abs}(coeff[k])$$

Note that the completely reconstructed transform coefficient values coeff[k] are used. Let tabRPrem[ ] be a fixed table of size 32. The Rice parameter RPrem is derived according to $$RPrem = \text{tab}RPrem[\max(\min(sumAbs - 20, 31), 0)].$$

Let tabRPabs[ ] be another fixed table of size 32. The Rice parameter RPabs used for coding abs_level is derived according to $$RPabs = tabRPabs[\min(sumAbs, 31)].$$

The variable pos0 depends on both, the sum of reconstructed absolute values in the local template and the state variable. Let pos0Tab[ ][ ] be a fixed table of size 3×32. The variable pos0 is derived according to $$pos0 = pos0Tab[\max(state - 1, 0)][\min(sumAbs, 31)].$$

When comparing the transform coefficient coding in VTM-6 with that of HEVC, it can be observed that the bin-to-bit ratio (average and worst case) is considerably higher in VTM-6. This is in particular the case when dependent quantization (i.e., trellis-coded quantization) is used. The bin-to-bit ratio specifies the average number of binary decisions (bins) that are decoded from a bit in the bitstream. The higher the bin-to-bit ratio, the higher is the effectiveness of the binary arithmetic coding. However, for implementations, a higher bin-to-bit ratio is disadvantageous. The binary arithmetic coding is hardly parallelizable and, hence, the implementation complexity (in particular for a decoder) that may be used is determined by the number of bins to be coded or decoded. For a given bit rate, the implementation complexity that may be used increases with the bin-to-bit ratio. Due to that reason, coding approaches with a lower bin-to-bit ratio are advantageous, if they can achieve a very similar coding efficiency.

Thus, below, we describe a concept by which the bin-to-bit ratio can be reduced while it achieves virtually the same coding efficiency as the VTM-6 method. It is thus better suited for efficient implementation. The subsequently described embodiments particularly address the transform coefficient coding for dependent quantization. It is, however, not restricted to this case. Several configurations can also be used with conventional independent quantization. In addition, the subsequently described embodiments can be extended to non-binary syntax elements that are not related to transform coefficient levels. For example, the following non-binary syntax elements often found in video codecs could also be coded using context-adaptive binarization:

quantization indexes in transform skip mode;
residual samples in lossless coding;
components of motion vector differences.

The basic idea is to switch the binarization depending on one or more variables, which can be derived during encoding and decoding. In conventional transform coefficient coding schemes (and also in VTM-6), a fixed binarization scheme is used. The binarization for a current transform coefficient level (or, more general, any non-binary syntax element) is selected among a pre-defined set of two or more binarizations depending on the value of one or more derived variables. In this context, the goal is to select the binarization that results, on average, in the minimum number of bins per syntax element (while at the same time, achieving a high coding efficiency). The variables that are used for selecting the binarization can be previously coded syntax elements or variables that are derived based on previously coded syntax elements.

In the following, embodiments are described for the important example of coding transform coefficient levels, in particular, transform coefficient levels used in connection with dependent quantization (as specified in VTM-6). As noted above, it is, however, possible to apply the subsequently described embodiments to the entropy coding of any other non-binary syntax element.

1. Context-Dependent Binarization

The binarization used for the absolute values of transform coefficient levels (i.e., quantization indexes) in VTM-6 (see above) is suitable for probability mass functions (pmfs), for which the probability decreases with the increasing absolute value. For an absolute value of 0, a single bin is transmitted; for an absolute value of 1, two bins are transmitted, for absolute values of 2 and 3, four bins are transmitted, etc. The number of bins used for a particular absolute value is never smaller than the number of bins for any smaller absolute value. Investigations of the actual probability distributions showed that for certain cases (for example, the quantization stages 2 and 3), the absolute value of 1 has a higher probability than the absolute value of 0. In these cases, the bin-to-bit ratio could be reduced by using a binarization with the property that an absolute value of 1 is coded with only one bin, while an absolute value of 0 is coded with two bins (for absolute values larger than 1, the number of bins is not modified).

As a particular example, Table 3 shown in FIG. 8 shows an example of two different binarizations B1 and B2 for the absolute values of transform coefficient levels. The first binarization B1 is identical to the VTM-6 binarization. The second binarization B2 is an alternative binarization, in which the first two bins (marked with colors) are modified. In the binarization B2, first a bin eq1_flag is transmitted which specifies whether the absolute value is equal to 1 or not. If eq1_flag is 1, no further data are transmitted for the current absolute value. If eq1_flag is 0, the next bin gt1_flag specified whether the absolute value if greater than 1. If gt1_flag is equal to 0, the absolute value is 0 and no further data is transmitted. Otherwise, if gt1_flag is equal to 1, the absolute value is specified by transmitting the bins par_flag, gt3_flag, and the non-binary syntax element rem as in the VTM-6 binarization. In this example, the binarization B1 is advantageous for cases in which an absolute value of 0 has a higher probability than an absolute value of 1; and the binarization B2 is advantageous for cases in which an absolute value of 0 has a smaller probability than an absolute value of 1. Switching the binarizations accordingly, this would reduce the average bin-to-bit ratio.

One property of the example in Table 3 in FIG. 8 is that the two binarizations B1 and B2 only differ in the first two bins. The remaining bins par_flag and gt3_flag as well as the non-binary syntax element rem have the same meaning in the two binarizations. In general, this is an advantage, since these bins and non-binary values (i.e., the elements that have the same meaning in the two binarizations) can be coded using the same set of contexts or, for the non-binary elements, the same set of codes.

It should be noted that gt1_flag has a different meaning in the two binarizations B1 and B2 (even though the name "greater than 1" flag is the same). In binarization B1, the probability of gt1_flag equal to 1 is the conditional probability that an absolute level is greater than 1 given that the absolute level is greater than 0. Whereas in binarization B2, the probability of gt1_flag equal to 1 is the conditional probability that an absolute level is greater than 1 given that the absolute level is not equal to 1. In general, it is advantageous to code the bins with different meaning using different sets of context models (more details follow below). For the example of Table 3, it means that the eq1_flag of binarization B2 is coded with a different set of context models (and potentially a different method of context derivation) than the any of the flags of binarization B1; and the gt1_flag of binarization B2 is coded with a different set of context models than any of the bins of binarization B2 (in particular, with a different set of context models than the gt1_flag of binarization B1). The flags with the same meaning (par_flag and gt3_flag in the example) are typically coded using the same set of context models and the same method of context derivation. In addition, the non-binary syntax elements with the same meaning (rem in the example) are coded with the same code or the same set of codes (e.g., Golomb-Rice codes).

Note that other configurations are possible, for example:
More than two binarizations could be used;
The two or more binarizations could be completely different, without any bins with the same meaning;
Flags that have a different meaning in different binarizations could still be coded using a common set of context models;
Flags that have the same meaning in different binarization could be coded using different sets of context models;
Different codes or set of codes or different concepts for deriving a parameter such as the Rice parameter could be used for non-binary syntax elements in different binarizations.

Table 4 in FIG. 9 shows another example with three different binarizations B1, B2 and B3. The first two binarizations are the same as in the example of Table 3 of FIG. 8. In the third binarization B3, first a gt1_flag is transmitted which specifies whether the absolute level is greater than 1 or not. If gt1_flag is equal to 0 (or more, general, it indicates that the absolute level is not greater than 1), an eq1_flag is transmitted which specifies whether the absolute level is equal to 1 or equal to 0. Otherwise, of gt1_flag is equal to 1 (or more, general, it indicates that the absolute level is greater than 1), then the flags par_flag, gt3_flag, and the non-binary syntax element rem are transmitted in the same way as for the other two binarizations. With this binarization, the number of bins for all absolute values greater than 1 is decreased by 1 (in comparison to the binarizations B1 and B2). Hence, the binarization B3 is advantageous for cases in which the probability that an absolute level is greater than 1 is larger than the probabilities that an absolute level is equal to 0 and larger than the probability that an absolute level is equal to 1.

It should be noted that in binarization B3, the eq1_flag and the par_flag could be combined into a single par_flag (since eq1_flag is only coded if gt1_flag is equal to 0, and par_flag is only coded if gt1_flag is equal to 1). In some situations, it can make sense to distinguish eq1_flag and par_flag for the context modelling. For example, it can be advantageous, to use a different set of context models and/or a different method for context derivation for these two bins.—Even in this case, the two flags could be combined into a single par_flag, but that would complicate the context modelling. Eventually, it is technically the same whether gt1_flag and par_flag are treated as different bins or whether they are combined into a single par_flag.

As noted above, further variations for the binarizations for absolute transform coefficient levels are possible (e.g., more binarizations, different versions of the multiple binarizations, etc.). In addition, multiple binarizations could also be used for other syntax elements, i.e., syntax elements that are not related to transform coefficient levels (or quantization indexes for transform coefficients).

1.1 Selection of the Binarization

In the following, embodiments for methods of selecting the binarization among a pre-defined set of binarizations are described. In the description, we concentrate on the coding of transform coefficient levels (i.e., the coding of quantization indexes) in connection with dependent quantization. The embodiments are also applicable for transform coefficient coding with conventional scalar quantization. And as noted above, it can also be applied to other syntax elements.

For the following description, we assume that we code the absolute value $|q|$ of a current transform coefficient level q. And as a simple example, we have to select one of the two binarizations B1 and B2 shown in Table 3 in FIG. 8.

In one embodiment, the selected binarization depends on one or more of the following:
the state variable (with potential values of 0, 1, 2, 3) for dependent quantization;
the partially reconstructed absolute values (using data transmitted in the first coding pass) inside a local template T (the template may be fixed, or its shape and size may depend on other parameters);
the position (x,y) of the current transform coefficient inside the transform block;
the color channel (whether the transform block is a luma or chroma block).

In a particular embodiment, the chosen binarization (B1 or B2) depends only on the state variable for dependent quantization:
The binarization B1 is used if the state for the current coefficient is equal to 0 or 1;
The binarization B2 is used if the state for the current coefficient is equal to 2 or 3.

In another particular embodiment, the chosen binarization (B1 or B2) depends on the state variable for dependent quantization and the sum sumAbs of partially reconstructed absolute levels abs1[k] in a local template T around the current scan position. The variable sumAbs is given by:

$$\text{sumAbs} = \sum_{k \in T} \text{abs1}[k],$$

where abs1[k] represents the partially reconstructed absolute level for a scan index k after the first pass. For the binarizations B1 and B2, abs1[k] is given by $$\text{abs1}[k] = sig\_\text{flag}[k] + gt1\_\text{flag}[k] + par\_\text{flag}[k] + 2*gt3\_\text{flag}[k] \text{ for } B1;$$

$$\text{abs1}[k] = eq1\_\text{flag}[k] + par\_\text{flag}[k] + 2*(gt1\_\text{flag}[k] + gt3\_\text{flag}[k]) \text{ for } B2.$$

Note that abs1[k] is equal to the value coeff[k] obtained after the first scan pass (see above). Flags that are not applicable (because they are not present as a result of the binarization) are inferred to be equal to 0. In the embodiment, the binarization is chosen as follows:
The binarization B2 is used if state is equal to 2 or 3 and sumAbs is greater than 0;
The binarization B1 is used otherwise.

In a more general formulation of the embodiment, the binarization is chosen as follows:
The binarization B2 is chosen if sumAbs is greater than Thres[state];

The binarization B1 is chosen if sumAbs is less than or equal to Thres[state].

Here, the array Thres[ ] is an array of four pre-defined thresholds (one for each possible value of the state variable). Some of the thresholds may be set in a way that the condition (sumAbs>Thres[state]) is always fulfilled for certain states and/or never fulfilled for certain states. Hence, this formulation includes the former two embodiments as special cases.

It should be noted that this formulation of the selection of the binarization is also applicable to conventional scalar quantization. This is a special case with a single state (i.e., state=0).

The last formulation of the binarization switching can also be used for more than two binarization. As an example, for three binarizations, the switching could be formulated according to:

The binarization B3 is chosen if sumAbs>Thres2[state];
The binarization B2 is chosen if Thres1[state] <sumAbs<=Thres2[state];
The binarization B1 is chosen if sumAbs<=Thres1[state].

Here, we have two pre-defined arrays of thresholds Thres1[ ] and Thres2[ ]. Similarly, the concept could be extended for more than three potential binarizations.

In other embodiments, the conditions may include other or additional variables, such as the position (x,y) of the current transform coefficient inside the transform block (in particular, a diagonal class as for context modelling in VTM-6);
other functions of the partially reconstructed absolute values inside a template;
the color channel (whether the transform block is a luma or chroma block).

1.2 Particular Example for Coding of Subblocks

For further illustrating the concept, we use the following embodiment for binarization switching as example. We assume that we have the two potential binarizations B1 and B2 of Table 3 in FIG. 8. The binarization used for a scan index k is selected according to:

The binarization B2 is chosen if sumAbs is greater than Thres[state];
The binarization B1 is chosen if sumAbs is less than or equal to Thres[state].

It should be noted that this method includes the following methods as subsets (for specific threshold arrays Thres[ ]):

The binarization B1 is chosen for state 0,1 and the binarization B2 is chosen for state 2,3:
This can, for example, be achieved with a threshold array of Thres[ ]={infinity, infinity, −1, −1};
The binarization B2 is chosen if state is 2 or 3 and sumAbs is greater than 0, otherwise B1 is chosen:
This can, for example, be achieved with a threshold array of Thres[ ]={infinity, infinity, 0, 0}.

In the following pseudo-code, we show a particular example for the coding of subblocks with coded_subblock_flag equal to 1. The example syntax includes the bypass concept of the VTM-6 (see above). The only change is that if sumAbs>Thres[state], the first part of the binarization is modified. In this case, first an eq1_flag is transmitted and, if eq1_flag is equal to 0, a gt1_flag is coded. If sumAbs<=Thres[state], the conventional VTM-6 binarization is used, i.e., first a sig_flag is transmitted and, if sig_flag is equal to 1, a gt1_flag is transmitted. In both cases, if gt1_flag is equal to 1, the binarization proceeds as in VTM-6, by coding par_flag, gt3_flag, and the remainder rem.

It should be noted that similar to the sig_flag in the VTM-6 binarization B1, the value of gt1_flag in binarization B2 can be inferred to be equal to 1 in some situations:

(1) The current scan position is equal to the scan index startScanIdx of the first non-zero coefficient in scanning order (i.e., the scan position that corresponds to the explicitly transmitted x and y coordinate);

(2) The current subblock is a subblock for which a coded_subblock_flag equal to 1 was transmitted, the current scan index is the maximum scan index maxSubblockScanIdx inside the subblock, and all previously transmitted (partial) absolute values in the subblock were equal to 1 (i.e., sig_flag=0 for B1; and eq1_flag=0 and gt1_flag=0 for B2).

A pseudo-code specifying the decoding of subblock with coded_subblock_flag equal to 1 and using context-adaptive binarization is shown in FIG. 10.

Note that the pseudo code of FIG. 10 only represents a particular example for the coding of transform coefficient levels with context-dependent binarization. The context-dependent binarization can be used in connection with other methods of transform coefficient coding, for example:

different binarizations;
usage of binarizations that do not have a common part;
more than two binarizations;
different conditions for selecting the binarization;
without a limitation on the maximum number of regular coded bins (i.e., without the third pass);
with a different switch to bypass coding (remainder rem) for different binarization.

1.3 Intermediate Presentation of an Embodiment

Figure 11A:
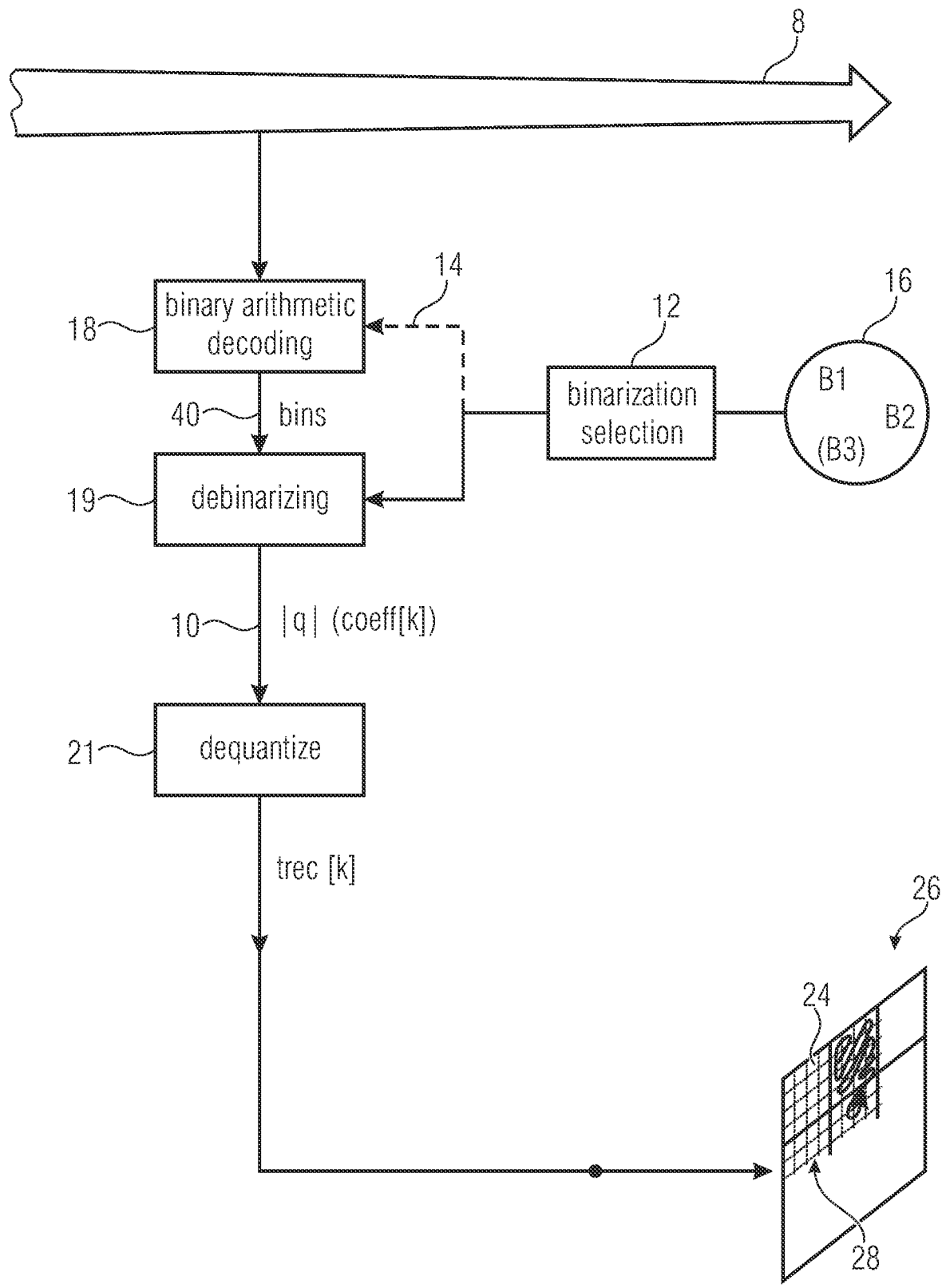
FIG. 11*a* shows a schematic diagram of a decoder including an apparatus for decoding am sequence of information values according to an embodiment.
Figure 11B:
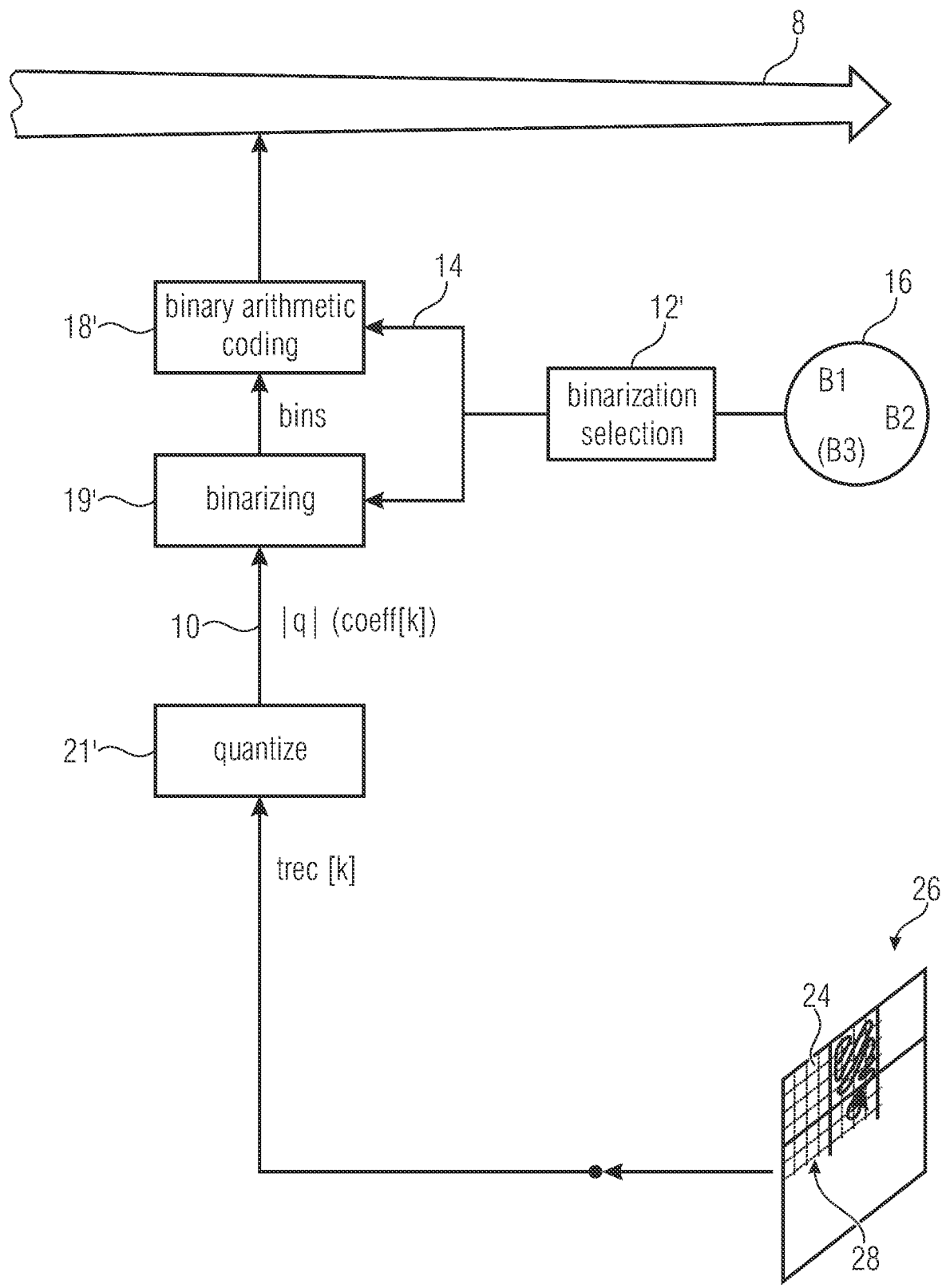
FIG. 11*b* shows a schematic diagram of an encoder fitting to the decoder of FIG. 11*a*.

As already indicated above, embodiments of the present application are not restricted to decoding of transform coefficients of a transform block representing, in transform domain, a prediction residual such as an intra-picture prediction residual or inter-picture prediction residual. Rather, embodiments of the present application may generally be used to code/decode any sequence of information values. Thus, FIG. 11*a* shows a corresponding apparatus for decoding a sequence of information values 10 using binary arithmetic coding, while FIG. 11*b* shows the corresponding apparatus for coding such a sequence of information values 10. In the following, the description concentrates on a description of the functionality and mode of operation of the decoder, but this description shall be understood as readily transferable onto the description of the corresponding encoder where each step of decoding from the data stream 8 is turned into a corresponding step of encoding into data stream 8, the debinarization to turn the decoded bins into the information values is turned into a step of binarizing the information values so as to obtain the bins, and the dequantization in order to turn the information values, optionally, into another signal such as the transform coefficients of a transform coefficient block or, to be more precise, transform coefficient levels, is turned into a corresponding quantization step to quantize such values so as to result into the information values.

Thus, as shown, the apparatus for decoding of FIG. 11*a* is configured to, or comprises a selector 12 configured to, for a currently decoded information value, select a selected binarization 14 out of a set 16 of binarizations for the currently decoded information value depending on previously decoded information values. Two examples were set out above, namely one where the set 16 comprises two binarizations B1 and B2, and another where the set 16 comprises binarizations B1, B2 and B3. Naturally, further examples might be formed such as examples where the set 16 comprises binarizations B3 and one of B1 and B2. And, beyond this, embodiments of the present application are not restricted to the specific examples of binarizations shown in the tables of FIGS. 8 and 9.

Further, the apparatus of FIG. 11*a* is configured to, or comprises a binary arithmetic decoder 18 configured to, arithmetically decode, for a currently decoded information value, bins of a bin string of the selected binarization 14 for that information value. They form the basis so as to obtain the currently decoded information value. Bin strings occurring in the binarizations of set 16 are exemplary depicted in FIGS. 8 and 9, namely in each row of each binarization's column with one such bin string being exemplarily encircled by a dashed line 22. Note that the term "bin" denotes a binary decision and, thus the bin strings 22 are indicated in the tables of FIGS. 8 and 9 as sequences of zeros and ones. Longer bin strings, however, are not completely indicated in that manner. Rather, so called remaining or trailing bins occurring in sub-column "rem" are indicated using a non-binary manner although they are also binarized/debinarized using some binarization sub-scheme such as a Rice code. In other words, the binary arithmetic decoder 18 derives, for each information value, a bin string 22 and these bin strings are illustrated in FIGS. 8 and 9 as a sequence of zeros and ones, namely for each binarization B1, B2 or B3 in the corresponding column of that binarization, followed by a binarization of the non-binary value occurring at the respective last sub-column "rem".

As already stated above, the sequence of information values 10 might be quantization indices of transform coefficients 24 of a transform block 26, traversed along a scan order 28. An example for such scan order had been discussed above with respect to FIG. 6*a*, namely a scan order 28 traversing the transform coefficients sub-block-wise, i.e., in units sub-blocks of the transform block 26. Such a traversal is also exemplarily depicted in FIGS. 11*a* and 11*b*. The present application is, however, not restricted to such scan order.

Alternatively, the information values 10 may be quantization indices of sample values of a block of sample values, traversed along a scan order. In other words, the information values 10 may be quantization indices of sample values which sample a corresponding block such as a picture block, in spatial domain, i.e., they might represent the block in spatial domain rather than a transform domain.

If using a transform domain, the transform coefficients 24 might be DCT coefficients, DST coefficients, or coefficients of some other separable two-dimensional transform, or the transform coefficients might be transform coefficients of a non-separable transform.

Even further, the sequence of information values 10 may be components of motion vector differences. Without compromising the generity of the description provided further below, it is assumed that the information values are quantization indices of transform coefficients 24 of a transform block 26, traversed along an scan order 28, but all the details set out above are, in this regard, only to be understood as an example and to be readily transferable onto any sort of sequence information values 10 and likewise, the transform block 26 might represent a prediction residual and transform domain, but this also only an example and the transform block 26 could also represent, for instance, a picture block, directly, i.e., not be a prediction residual.

Let's proceed with a description of the apparatus in FIG. 11*a* and the corresponding apparatus in FIG. 11*b*. As already stated, the binary arithmetic decoder 18 is for decoding of the binarizations selected for the information values from the data stream 8. Although the binary arithmetic decoder 18 could perform the decoding of the bins, according to some embodiment, without exact knowledge about the selected binarization 14 of the currently decoded information value, i.e., the information value to which the currently decoded bin currently decoded by the arithmetic decoder 18 belongs to, some embodiments described herein involve the exploitation of the knowledge about the selected binarization 14 by the binary arithmetic decoder 18 in decoding the bins of the binarizations 14 from data stream 8. Accordingly, the binary arithmetic decoder 18 is shown to be connected to the selector 12 by a dashed line. I.e., the connection is optional.

Further, the apparatus comprises a debinarizer 19 for debinarizing the bins belonging to a certain information value to derive the corresponding information value 10. That is, the debinarizer 19 recognizes as soon as the bins derived for a certain information value result into one of the valid bin strings 22 of the binarization chosen/selected for the corresponding information value by selector 12. To this end, the debinarizer 19 comprises an input connected to the output of selector 12. The selector 12, in turn, performs its selection out of set 16.

Downstream debinarizer 19, a dequantizer 21 dequantizes the information values 10 to obtain dequantized information values such as, as already indicated herein, transform coefficient levels of transform coefficients 24 of a transform coefficient block 26. The coding/decoding of the information values according to FIG. 11*a* and FIG. 11*b* is done sequentially and the same applies, naturally, to the arithmetic coding/decoding of the corresponding bins 20 of the bin strings 22 of the information values 10. The order at which the bins 20 are arithmetically decoded/coded might, however, be other than coding/decoding bins of a bin string of a certain currently decoded/coded information value completely, before attending to arithmetically decoding/coding the bins of a subsequent information value. While this information value by information value coding/decoding of the bins, such as in one pass, would be feasible as well, the example of FIG. 10, for instance, showed that the bins might be coded/decoded in more than one pass. Details and variation possibilities are discussed further below. In any case, the just-mentioned circumstance makes clear that the information value currently decoded/coded denotes the one for which one of its one or more bins is currently decoded/coded and one and the same information value may become the currently decoded/coded information value more than once during coding/decoding the sequence of information values.

A further note shall be done with respect to the selection of the selected binarization 14. Advantageously, the selection of the selected binarization 14 is done, for each information value 10, only once. The selection may be done, for each information value 10, prior to decoding/coding the first bin of its bin string of its selected binarization 14 such as in FIG. 10, and in that case, the knowledge about the selected binarization 14 is also available at the time of decoding the bins of the selected bin strings of the information values 10. In case of using context-dependent binary arithmetic coding/decoding, for each bin, it is thus known as which binarization same blongs to, and it is possible, accordingly, to select for each context-adaptively coded/decoded bin a context with an associated probability depending on the selected binarization 14 the respective bin is part of. However, according to an alternative embodiment, the latter dependency or even the context-adaptivity, could be left off and, thus, the selection of the binarization could be made inbetween or even after the coding/decoding the bins of the bin string of a corresponding information value for the corresponding information value. In particular, see, for instance, binarizations B1 and B2: both binarizations coincide in the domain of bin strings 22. Only the association of the bin strings 22 to the possible values for the information value, i.e. mapping between the domain of bin strings and the domain of possible values for the information value, is different. Accordingly, the arithmetic coding/decoding of the bins and even the recognition of valid bin strings, i.e., the recognition that a last bin for a certain bin string for a certain information value has been received, could be done without knowledge as to which binarization has finally been selected for this information value. However, as already indicated, it might be advantageous to perform the selection for a certain information value 10 prior to the actual arithmetic coding/decoding of any of the bins of its bin string, and set 16 might comprise binarizations not coinciding in the domain of bin strings.

Let's now turn to the embodiments outlined above. Here, the information values 10 are non-negative, i.e., positive, integers. As became clear from the above, the information values 10 may represent absolute values of integer valued information values such as transform coefficient levels or quantization indices. According to one example described above, the set 16 comprises a first binarization B1 and a second binarization B2. The first binarization B1 associates a first bin string $22_1$ of a first bin length, namely a bin length of 1 with a currently decoded information value assuming 0, i.e., with a possible value 0, and a second bin string $22_2$ of second bin length, namely a length of two bins, with a currently decoded information value assuming 1, i.e., with a possible value 1. The second binarization B2 associates a third bin string $22_3$ of a third bin length with a currently decoded information value assuming 0, and a fourth bin string $22_4$ of a fourth bin length with a current decoded information value assuming 1, wherein the first bin length equals the fourth bin length and the second bin length equals the third bin length. The example of binarizations B1 and B2 could, however, be varied. If varied, the variation could be done so that, still, the first bin length is unequal to the third bin length and/or the second bin length is unequal to the fourth bin length. Just as a side, it is noted that the latter circumstance would also apply when combining binarization B1 with binarization B3 to result into set 16 or when combining binarization B2 with binarization B3 to result into set 16. Just as it is the case with using binarizations B1 and B2, the first bin length may be smaller than the second bin length and the third bin length may be larger than the fourth bin length.

Further, in all bin strings 21 of the first binarization B1, the bin $30_1$ at the first bin position, i.e., the left most one in the bin strings 22 in the tables of FIGS. 8 and 9, is indicative of the currently decoded information value being zero or non-zero. I.e., this first bin $30_1$ indicates the significance of the information value |q|. This bin $30_1$ is given the name "sig", accordingly. In all bin strings 22 of the second binarization B2, the bin $30_1$ at the first bin position is indicative of the currently decoded information value being equal to 1 or being unequal to 1. This bin $30_1$ is, accordingly, entitled eq1 in FIGS. 8 and 9.

Figure 12:
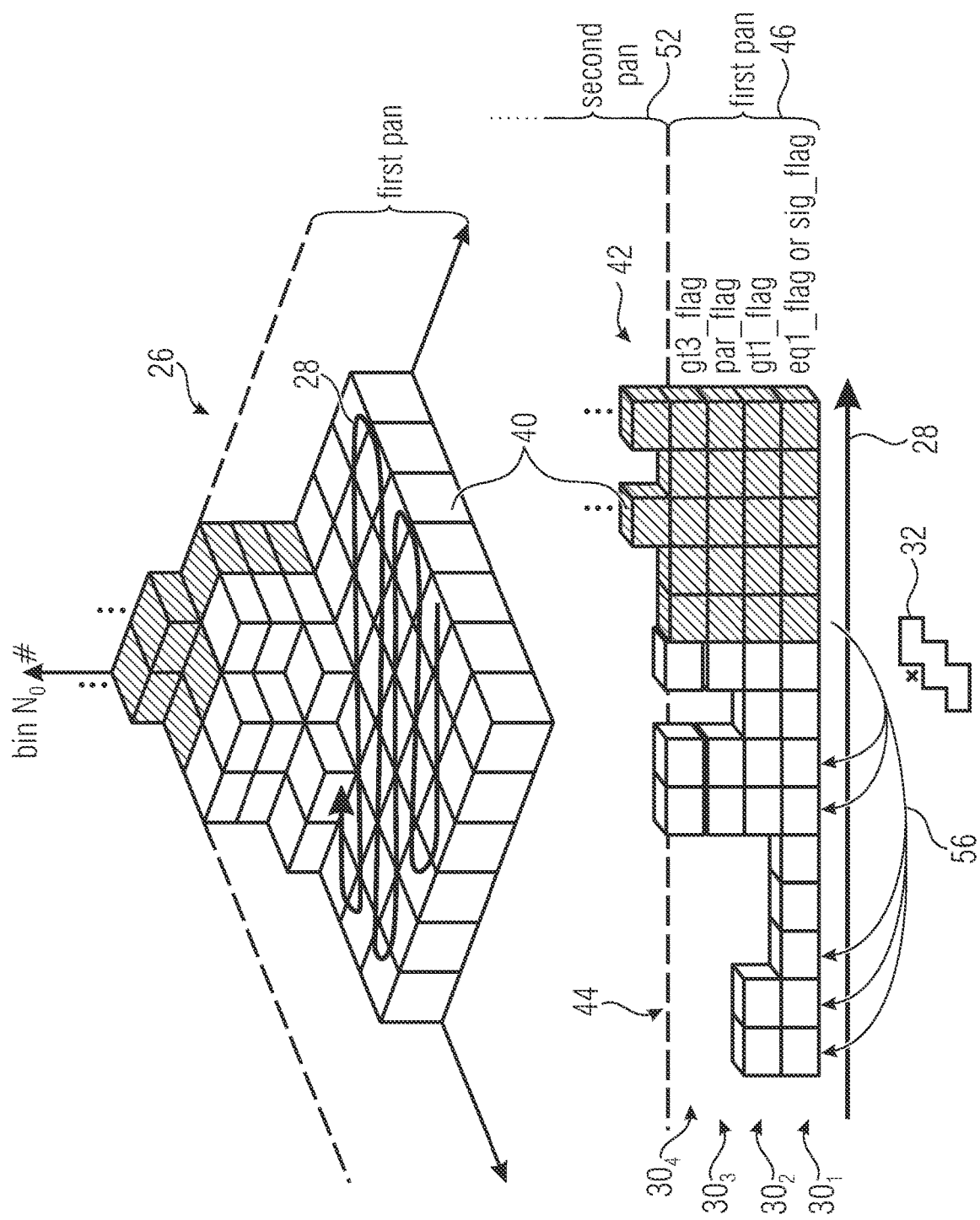
FIG. 12 shows a schematic diagram illustrating a block of transform coefficients, the sequencing of its coefficients, the binarization of the coefficients and the coding of the bins if the resulting bin strings of the coefficients, thereby illustrating a coding/decoding of a sequence of information values in a manner complying with FIG. 10.

As already denoted above, it might be that the arithmetic decoder 18 or arithmetic encoder 18'—please note that mutually corresponding modules in FIGS. 11a and 11b are denoted using the same reference sign with, however, adding an apostrophe in case of modules of the encoder—uses the selection of the selected binarization 14, i.e. the outcome of the binarization selection, so as to perform the context selection for context-adaptively coded bins among the bins of the information values. This is illustrated in the following on the basis of FIG. 12 along with FIG. 10. FIG. 12 shows an example for a transform coefficient block 26 and an example for the binarizations of the transform coefficients of the block 26. In particular, the bins 40 of the bin strings of the transform coefficients 26 are illustrated as cubes 40. The bins 40 of a bin string belonging to a certain transform coefficient are illustrated as piles or columns of these bins 40 one upon the other. The first bin $30_1$ is the lowest most bin, with a second bin $30_2$, third bin $30_3$ and so forth following in the upper direction. Thus, the bin strings, i.e., the columns of bins 40, correspond to one information value each, namely a quantization value belonging to certain transform coefficients of block 26, and they are depicted in FIG. 12 in a manner arranged side by side corresponding to their positions within block 26. The scan order 28 at which the information values 26 are sequentially coded, is also depicted. Thus, the order 28 results in the information values or quantization indexes of the transform coefficients of block 26, forming a sequence 42 of information values, such as at the bottom of FIG. 12. As already noted above, in accordance with FIG. 6a, it may optionally be that the actual coding of the information values starts, along order 28, at the first transform coefficient or information value not being zero, with a corresponding bin string indicated at 44.

As illustrated in FIG. 12, the selection by module 12 results into two different sorts of transform coefficients: ones whose bin string belongs to binarization B1, and ones whose bin string belongs to binarization B2. Bins of bin strings belonging to binarization B2 are indicated in a hatched manner in FIG. 12. In FIG. 10, the selection 12 of the binarization to be used for each transform coefficient or information value is done within the first pass 46 along order 28 for each coefficient or information value individually. Accordingly, although FIG. 12 suggests that from some information value within sequence 42 onward, the selected binarization changes from one binarization, here binarization B1, to the other, this is only an example and it will become clear that this may very well be different than shown in FIG. 12.

The embodiment of FIG. 10 or FIG. 12 shows that the bins 40 may be coded in several passes. The first pass 46 may, as in the example of FIGS. 10 and 12, encompass those bins 40, which are coded context-adaptively, whereas other bins may be coded using a bypass mode of decoder/encoder 18/18' according to which an equi-probability is assumed among the possible bin states. Another characteristic is true with respect to the selection as to which bins are encoded/decoded within the first pass 46 in the example of FIG. 10: the first pass 46 includes, for the bin string of each information value 10 of sequence 42, all bins from the first bin $30_1$ up to the n-th bin, here the fourth bin $30_4$, —wherein the bin strings of some information values may only comprise only the first bin $30_1$ or the bins from this first bin $30_1$ up to some bin in-between that first bin $30_1$ and the n-th bin $30_4$—wherein this n-th bin indicates for both binarizations B1 and B2 whether the information value of the corresponding bin string is greater than n−1 or not. In other words, these first n bins $30_1$ to $30_4$ coded within the first pass 46 enable to uniquely indicate whether the information value of the corresponding bin string has a value between 0 . . . n−1, both inclusively, or is greater than n−1, such as at least n of at least n+1, depending on whether the information value is odd or even, with this being true for both, the first and the second binarization B1 and B2. It should be noted, however, that several variations relative to the example of FIGS. 10 and 12 are imaginable. For instance, when combining binarization B1 or B2 with binarization B3 in order to form sets 16, it might be that the first pass 46 includes the first four bins $30_1$ to $30_4$ of binarization B1 or B2, while including only the first three bins of binarization B3. All these bins would be encoded context-adaptively, whereas the subsequent bins would be coded using the bypass mode.

In particular, when using binarizations B1 and B2, the first bin $30_1$ of the bin string of each information value is either flag sig_flag, namely, if the bin $30_1$ is part of a bin string 22 of binarization B1, or an eq1_flag if the first bin $30_1$ is part of a bin string of the second binarization B2. The second bin $30_2$ of each bin string is gt1_flag. Beyond that, in all bin strings 22 of the first binarization B1 having a bin length larger than 2, and in all bin strings 22 of the second binarization B2 having a bin length larger than 2, the bin $30_3$ at the third bin position is indicative of the currently decoder information value being even or odd. Its called par_flag, accordingly, where "par" stands for parity. Beyond that, as shown in FIGS. 8 and 9, in all bin strings 22 of the first binarization B1 having a bin length larger than 3, and in all bin strings of the second binarization B2 having a bin length larger than 3, the bin $30_4$ at the fourth bin position is indicative of the currently decoded information value being greater than 3 or not being greater than 3. This bin is, accordingly, called gt3_flag.

In the first pass 46, all bins belonging to that pass 46 and belonging to a certain information value are coded/decoded before proceeding with the bins belonging to that pass 46 and the next information value, respectively. This means, as shown in FIG. 10, that the binarization selector 12 performs the selection 12 for a certain current information value wherein, then, arithmetic decoder/encoder 18/18' performs the decoding/coding of the first bin of the bin string of the selected binarization of the current information value. This is eq1_flag in case of binarization B2, and sig_flag in the case of binarization B1. Still within the first pass, the arithmetic decoder/encoder 18/18' performs, depending on the first bin $30_1$, of the current bin string, the coding/decoding $18_2$ of the second bin $30_2$ of the current bin string of the current information value, namely in case of the first bin $30_1$ indicating that the current information value is unequal to 1 in case of binarization B2, and in case of the first bin $30_1$ indicating that a current information value is unequal to 0 in case of binarization B1. This second bin $30_2$ is gt1_flag in case of both binarizations. Depending thereon, if it is indicated that the current information value is greater than 1, still within the first pass 46, the arithmetic decoder/encoder 18/18' proceeds with the decoding/encoding $18_3$ and 184 of the third and fourth bins $30_3$ and $30_4$ of the currently visited information value.

That is, in this first pass 46, the first n bins, here bins $30_1$ to $30_4$, of the bin string of each coefficient are derived before proceeding to the next information value along sequence 42. The debinarization 19 is performed as far as possible. That is, continuously and depending on the binarization having been selected, the sequentially coded/decoded bins are used in order to adapt/increase a minimum value of the currently decoded/coded information value as determinable based on the bins of the bin string of that information value decoded/coded so far. The occasions at which this update/increase is done are shown at 48 in FIG. 10. Thus, based on the four bins $30_1$ to $30_4$ coded/decoded during the first pass 46, it is clear for each previously scanned information value as to whether same is equal to any of 0 to 3, both inclusively, at least equal to or larger than 4, or equal to or larger than 5.

The latter two update results result from bin $30_4$, i.e. the gt3_flag, indicating an exceed of 3, with the latter option (>=5) corresponding to the information value being indicated to be odd valued and resulting in the minimum absolute value to be set to 5, while the former option (>=4) corresponds to the information value being indicated to be even valued and the minimum absolute value is set to 4. The parity is indicated by the third bin $30_3$ after which bin $30_4$ follows inevitably. Based on this minimum value for previously scanned information values, a context determination may be performed using previously coded/decoded information values within a template such as template 32 of FIG. 7. The circumstance is exemplarily depicted in FIG. 12 for a predetermined information value. Arrows 50 point from that information value's bin string to the bin strings belonging to information values located within template 32 and having previously been coded/decoded.

As already indicated above, in a second pass 52, which follows the first pass 46, the remaining bins 40 of those information values may be coded/decoded along scan order 28, for which it is clear based on those bins included in the first pass 46, that they are equal to, or larger than 4, or equal to or larger than 5, i.e., those for which bin $30_4$, gt3_flag, is equal to 1. The bins of the second pas, thus, correspond to a binarization of the difference of the magnitude of the actual information value on the one hand and the afore-mentioned minimum absolute value on the other hand. This binarization may be a Rice code, for instance, or a Golom code. This decoding, done in the bypass mode, is done at $18_5$. In another pass, pas 54, the sign flags may be coded/decoded at $18_6$. Naturally, the sign flag may merely be coded/decoded for information values for which it is clear that same are unequal to 0.

As optionally depicted in FIG. 10, it might be that the number of context-adaptively coded bins in the first pass 46 is restricted until some maximum number of bins coded/decoded context-adaptively is reached. For instance, the bins belonging to the first pass 46 of a currently visited information are coded within the first pass 46 context-adaptively only in case of the remaining bins up to the maximum number of context-adaptively bins suffices to decode/code the maximum number of bins to be coded/decoded for any information value to come, which is 4 in the present example. See the check at 56 in FIG. 10. If the maximum number is reached or the remaining bins are too low in number, the second pass 52 is performed until the last information value for which the bins belonging to the first pass 46 have been coded context-adaptively as shown at 58, with then, within a third pass 60, coding/decoding all remaining information values along sequence 42 in bypass mode using a binarization which may also underlie the binarization of the remaining bins that are encoded in the second pass 52, but which may also be different therefrom. Thus, for the information values coded/decoded in the third pass, all bins are coded/decoded in bypass mode.

2.1 Context Modeling

Let's resume the above presentation of the binarization selection according to sections 1.1. and 1.2 by possible implementations for context modelling (i.e., the selection of probability models for regular coded bins). We concentrate on the example of transform coefficient coding specified in the pseudo-code above in sec. 0. In this example the binarization B1 is identical to the binarization in VTM-6 and the second binarization differs in the first two bins (eq1_flag and a second version of gt1_flag).

In an embodiment, the probability model for each regular coded bin is selected (similarly to VTM-6) based on one or more of the following:
- whether the current transform block is a luma or chroma transform block;
- the state for dependent quantization;
- the x and y coordinate of the current transform coefficient;
- whether the current transform coefficient is the first non-zero coefficient in coding order inside the transform block;
- the partially reconstructed absolute values (after the first pass) in a local neighborhood.

Furthermore, the Rice parameter for the remainder rem and the bypass-coded absolute values abs_level as well as the variable pos0 (which specifies the mapping of abs_level to absolute values) are determined in the same way as for VTM-6 (see above).

In a particular version of the embodiment, the probability model selection for the following regular coded bins is identical to that of VTM-6:
- sig_flag and gt1_flag for the first binarization B1;
- par_flag and gt3_flag for both binarizations B1 and B2.

In one version of the embodiment, the probability model for eq1_flag (binarization B2) is selected based on the following:
- whether the current transform block is a luma or chroma transform block;
- the state for dependent quantization;
- a diagonal class (for example, same class as for sig_flag of the conventional binarization B1);
- a function of the sum sumAbs of partially reconstructed absolute values (after the first pass) in a local neighborhood (for example, the same function f(sumAbs) =min((sumAbs+1)»1,3) as for sig_flag could be used).

In another version, the probability model for eq1_flag (binarization B2) is independent of the state variable, and is selected based on whether the transform block is a luma or chroma block, a diagonal class, and a function of the sum sumAbs of partially reconstructed absolute values (after the first pass) in a local neighborhood. In further versions, other combinations of the above mentioned general features are used for context modelling of eq1_flag.

Similarly, in one version of the embodiment, the probability model for gt1_flag of binarization B2 is selected based on the following:
- whether the current transform block is a luma or chroma transform block;
- the state for dependent quantization;
- a diagonal class (for example, same class as for sig_flag of the conventional binarization B1);
- a function of the sum sumAbs of partially reconstructed absolute values (after the first pass) in a local neighborhood (for example, the same function f(sumAbs)= min((sumAbs+1)»1,3) as for sig_flag could be used).

In another version, the probability model for gt1_flag of binarization B2 is independent of the state variable, and is selected based on whether the transform block is a luma or chroma block, a diagonal class, and a function of the sum sumAbs of partially reconstructed absolute values (after the first pass) in a local neighborhood. In further versions, other combinations of the above mentioned general features are used for context modelling of gt1_flag.

2.2 Context Modeling

Let us now resume the description of section 1.3. Again, all the details set out in sections 1.1, 1.2 and 2.1 shall be understood as plausible implementation details which may be applied onto the description set forth in the other section 1.3 and the present section individually or in combination.

In particular, as far as the context-selection is concerned, which is performed by the arithmetic decoder/encoder $18/18'$, the following may apply.

For instance, the bin $30_1$ of the first bin position of the bin strings of the information values 10 may be arithmetically coded/decoded using a probability model which is selected in the following manner. In particular, the probability model to be used for arithmetically coding/decoding this bin $30_1$ may be selected depending on whether this bin $30_1$ currently coded/decoded is within the first or the second binarization, i.e., the selection is made dependent on whether this bin $30_1$ is part of a bin string of the first binarization or part of a bin string of a second binarization. Additionally or alternatively, the selection of the probability model to be used for arithmetically coding/decoding bin $30_1$ may be made out of a set of probability models associated with, or dedicated for, the first bin position, i.e. the first bin $30_1$, on the one hand and the selected binarization 14 the respective bin $30_1$ is part of, on the other hand. In doing so, the selection out of the set may be done depending on one or more of 1) whether the information value the binarization of which bin $30_1$ is part of represents luma or chroma information, 2) a position of the information value, the binarization of which bin $30_1$ is part of, inside a block of information values, such as block 26, and 3) a function of a minimum magnitude value of one or more information values, which correspond to positions in a block of information values which fulfil a predetermined locational relationship relative to a predetermined positon of the information value the binarization of which the bin $30_1$ is part of, the minimum magnitude value being determined based on previously decoded bins of a binarization of the one or more information values. That is, this function could be applied onto the aforementioned minimum values derived for the bins belonging to the first pass 46 of previously traversed information values, which reside within template 32, wherein the function may, for instance, include a summation, a weighted summation or a similar scalar function. Quantization may be used in order to map the function result onto the number of available probability models within the set out of which the selection is performed. In other words, for the determination of the context of probability models to be used for encoding/decoding a certain bin $30_1$, encoder/decoder $18/18'$ do the following: They locate the neighboring information values within template 32. The errors 50 in FIG. 12 point thereto for bin $30_1$ of a certain information value. All bins belonging to the first pass 46 of the bin strings of these neighboring information values have already been coded/decoded. It is, thus, possible to determine for each of these neighboring information values a minimum absolute value, i.e., a value which the absolute of the corresponding neighboring information value assumes at minimum. To this end, encoder and decoder may exploit the knowledge about the binarization selected for each neighboring information value. Thus, for each neighboring information value, a minimum absolute value results and same may be subject to a function such as a scalar function which may, for instance, involve a summation of the minimum absolute values and a quantization onto a number of context indices each of indexes a different one of contexts for the bin $30_1$ and the selected binarization that bin $30_1$ is pert of.

Similar statements as done with respect to bin $30_1$ may be true with respect to the second bin $30_2$ and the arithmetic coding/decoding thereof. That is, encoder and decoder $18/18'$ may, for the sake of arithmetically coding/decoding such a bin $30_2$, use a probability model which, in turn, is selected in the following manner: firstly, a set of probability models may be selected out of sets of probability models depending on whether the currently coded/decoded bin $30_2$ is part of a first or a second binarization B1 or B2. That is, a set of contexts is selected out of several ones each of which corresponding to one of the binarizations in set 16, and the one associated with the selected binarization 14 is chosen. Out of the thus selected set of contexts or set of probability models, respectively, the probability model to be finally used for arithmetically decoding/coding the bin $30_2$ is selected depending on one or more of 1) whether the information value the binarization of which bin $30_2$ is part of, represents luma or chroma information, 2) a position of the information value, the binarization of which the bin $30_2$ is part of, inside a block of information values such as block 26, and 3) a function of minimum magnitude values of one or more information values within a template 32 located at the position of the information value the binarization of which the bin $30_2$ is part of. The function may be different from the function used for bin $30_1$ or may be the same.

2.3 Alternative Using Another Set of Binarizations

As already denoted above, the description brought forward above with respect to FIGS. 10-12 primarily concentrated on the usage of a set 16 of binarizations, which include binarizations B1 and B2 exclusively, but it had already been indicated above that it is alternatively possible to compose set 16 by other binarizations. For instance, according to FIG. 9, set 16 could be composed in a manner where binarization B3 is combined with one or both of binarizations B1 and B2. This possibility will now be discussed in the following.

In particular, according to this composition of set 16, while the information values 10 are non-negative integers, the set 16 of binarizations would comprise a first binarization such as B1 or B2, which associates a first bin string $22_1$ with a currently decoded information value assuming 0, and a second bin string $22_2$ with a currently decoded information value assuming 1, and a second binarization such as B3, which associates a bin string $22_5$ with a currently decoded information value assuming 0, and a sixth bin string $22_6$ with a currently decoded information value assuming 1. At least one of the bit lengths of bin string $22_1$ and $22_5$ on the one hand and bin string $22_2$ and $22_6$ on the other hand would be unequal to each other. The same applies when comparing binarization B2 and B3. Further, a maximum bit length of bin strings $22_1$ to $22_6$ would be two. In such a case, the set 16 comprising binarization B3 and one or more of binarizations B1 and B2, would further result into the following characteristic: for integers x>1, the first binarization B1 or B2 would associate bin strings with a currently decoded information value assuming x and the second binarization B3 would associate bin strings with a currently decoded information value assuming x such that the bin length of these bin strings is larger than 2 and differ by 1 when comparing the bin strings of the first and second binarizations, respectively. That is, for each x, the corresponding bin string of the second binarization would be by one bin longer than the corresponding bin string of the first binarization. This is because of the omission of the eq1_flag of binarization B3 as discussed above in section 1.2. See, for instance, B1 and B3 in FIG. 9: bin strings for |q| are all three bins long or longer and the bin strings 22 of binarization B3 are one bin shorter than the corresponding bin strings 22 of binarization B1 in the same line, i.e., belonging to the same value for |q|, and the same applies to binarization B2 with respect to binarization B3.

With respect to the bin lengths of the bin strings associated with the integer value being 0 or 1, the following holds true: compare, for instance, B1 and B3, i.e., if binarization B1 and B3 are included in set 16. Then, the bin length of the bin string $22_1$ is smaller than the bin length of bin string $22_5$ and the bin length of the bin strings for larger integer values is smaller within binarization B3 than compared to the binarization B1. When comparing B2 and B3, the bin length of bin string $22_4$ is smaller than the bin length of the bin string $22_6$ with a bin length of bin strings associated with integer values larger than 1 being smaller within binarization B3 than compared to binarization B2.

Further, in all bin strings of binarization B1, the bin $30_1$ is indicative of the currently decoded information value being zero or non-zero, while this first bin $30_1$ in the bin strings of binarization B3 is indicative of the currently decoded information value being greater than 1 or not being greater than 1. Likewise, in all bin strings of binarization B1 having a bin length larger than 1, bin $30_2$ is indicative of the currently decoded information value being greater than 1 or not being greater than 1, while in all corresponding bin strings of binarization B3, i.e. ones longer than 1 bin, bin $30_2$ is indicative of the currently decoded information value being even or odd. Note that in table of FIG. 9, the bin $30_2$ occurs in the second and third columns of the bins of the bin strings of binarization B3 under sub-columns eq1 and par, respectively, due to the omission of flag eq1 for bin strings of information values larger than 1 (in magnitude). Bin $30_2$ in binarization B3 is called eq1 or par, depending on whether the bin $30_2$ is within a bin string longer than 2 bins or not.

Further, in all bin strings of binarization B1 having a bin length larger than 2, bin $30_3$ is indicative of the currently decoded information value being even or odd, while all corresponding bin strings of binarization B3, i.e., all bin strings of binarization B3 having a bin length larger than 2, the bin at the third bin position, i.e., $30_3$, is indicative of the currently decoded information value being greater than 3 or not greater than 3. In binarization B3 this bin $30_3$ is within the forth column.

Further, in all bin strings of binarization B1 having a bin length larger than 3, bin $30_4$ is indicative of the currently decoded information value being greater than 3 or not being greater than 3, while for integers x>N, wherein in the example of FIG. 9 N is equal to 3, binarization B1 associates bin strings with the currently decoded information value assuming x and binarization B3 associates bin strings with the currently decoded information value assuming x, which associated bin strings coincide in a run of trailing bins. This run of trailing bins is, particularly, the binarization of "rem". That is, in the example of FIG. 9 and also in the example of FIG. 8, the same sort of binarization may be used for the binarization of "rem". These means that, for integers x>N, a first one of the binarization such as B1 associates fifth bin strings with the information value assuming x, and a second one of the second binarization such as B2 associates sixth bin strings with the currently decoded information value assuming x, and the fifth bin strings and the sixth bin strings may coincide in a run of trailing bins, namely rem, wherein the trailing bins might be arithmetically coded/decoded using an equi-probability bypass mode, while initial bins preceding the trailing bins are arithmetically coded/decoded context-adaptively. But such coincidence may even extend beyond bypass-coded trailing bins. For instance, for integers x>N, a first binarization such as B1 or B2 may associates fifth bin strings with the information value assuming x, and a second binarization such as B3 associates sixth bin strings with the information value assuming x, wherein the fifth bin strings and the sixth bin strings coincide in a run of a predetermined number of bins which extends from an end of the fifth and sixth bin strings beyond the trailing bins so as to also comprise one or more initial bins preceding the trailing bins, namely par and get3.

Thus, above characteristics and comparisons are also feasible when comparing B3 and B2.

In treating the bins of binarizations of set 16 where binarization B3 is included and one of binarizations B1 and B2 (or both of them), the trailing bins, i.e., rem, are arithmetically decoded/coded using the equi-probability bypass mode, while the preceding or initial bins preceding these trailing bins are coded/decoded context-adaptively. Note that, thus, these context-adaptively arithmetically coded/decoded bins are those under columns sig, gt1, par, gt3, eq1, gt1, par and gt3, respectively.

Note the following with respect to transferring the example of FIGS. 10 to 12 onto an example for set 16 comprising binarization B3 and, for instance, any of binarizations B1 and B2 or both of them: for bin strings of information values for which binarization B3 is selected, only the first three bins $30_1$ to $30_3$ would be included into the first pass, while the second pass 52 would include the remaining bins "rem" denoted trailing bins in the just-preceding statement.

As got clear from the previous example, it may also be in case of construing set 16 by including binarization B3, that the bins $30_1$ of a certain bin position for a certain bin string of a certain information value may be arithmetically coded/decoded using probability models which are different when comparing bins at this very bin position which belong to one binarization and bins which belong to this bin position and belong to any other binarization.

On the other hand, for all combinations of binarizations B1 to B3 to result into set 16, it might be that for at least one bin at at least one bin position within one binarization of set 16, the same probability model or the same set of probability models is used as for the bin at the same bin position or at another bin position of another binarization of set 16. For instance, for all bins called par in binarizations B1 to B3 the same or a common probability model or the same or a common probability model set may be used and the same may apply alternatively or additionally for bin gt3 of binarizations B1 to B3.

3. Combination with Dependent Quantization

Although not specifically discussed in the above description of the examples set out with respect to FIGS. 10 to 12 so far, it should be noted that the optional quantization/dequantization applied to result in to, or applied on to the information values 10 may be implemented using dependent quantization or may be implemented using usual quantization where each information value is quantized/dequantized independently from other information values.

In particular, as far as the dequantization in module 21, for instance, is concerned, same may be illustrated with respect to FIG. 4: the dequantization of the sequence of information values 10 using dependent quantization may be done as follows, wherein the sequence of information values is denoted "level [k]" in FIG. 4 with the index k traversing the sequence sequentially. In particular, for a currently dequantized information value level [k] a selected information-value-to-reconstruction-level mapping is selected out of a plurality of information-value-to-reconstruction-level mappings. The plurality of information-value-to-reconstruction-level mappings according to an embodiment had been shown in FIG. 1. There, two mappings existed. The selection and the mappings are implemented in FIG. 4 in the fourth line. The selection depends on the quantization state for the currently dequantized information value, namely state in FIG. 4. A state update is then performed in the penultimate line of FIG. 4: the quantization state is updated depending on the currently dequantized information value, namely "level [k]", thereby obtaining a quantization state for an information value to be dequantized subsequently.

As an interesting point and as described before, the selection of the selected binarization 14 out of the set 16 of binarizations may be done depending on the quantization state for the currently dequantized information value. This had been described above in section 1.1.

To be more precise, the set 16 of binarizations may comprise a first binarization such as B1 and a second binarization such as B2, and the plurality of information-value-to-reconstruction-level mappings may comprise a first one and a second one such as those shown in FIG. 1. The dequantization may then be done in the following manner. The selection of the selected binarization out of the set of binarizations such as a set comprising B1 and B2 or a set comprising B1, B2 and B3, for the currently decoded information value may be performed by selecting among the binarizations within set 16 depending on whether the selection of the selected information-value-to-reconstruction-level mapping depending on the quantization state for the currently dequantized information value yields the first or the second information-value-to-reconstruction-level mapping, i.e., the selection of the binarization is done in a manner depending on the selection of the information-value-to-reconstruction-level mapping. For instance, B1 is used if "state" is 0 or 1 and B2 is selected or used if "state" is 2 or 3.

The sequence of information values may be ordered among a one-dimensional traversal of a block of information sample positions. This had been shown above. The sequence of information values may be quantization indices for transform coefficients of a transform block ordered along a scan order 28. In such an environment, the bins of the bin strings of the binarizations of the sequence of information values 10 may be sequentially coded/decoded in one or more passes of the sequence of information values, namely the passes discussed above with respect to FIGS. 10 to 12. In doing so, i.e., in coding/decoding the sequence of information samples, binarizations may be used exclusively which, for integers x>p, wherein p is, for instance, 0 for B1 to B3, associate with a currently decoded information value being x bin strings of a bin length which monotonically increases with x, and which is, at least if x>p+1, larger than p+1. For the first relative subclause, see FIGS. 8 and 9: the bin strings 22 never get smaller again when inspecting same from |q|=1 onwards towards larger values, for any one of binarizations B1 to B3. For the second relative clause, see FIGS. 8 and 9 as well: all bin strings from |q|=1 onwards towards larger values, are longer than 1 bin except for B2 where the bin length is 1 for |q|=1. This means that the first p+2 bins are sufficient to correctly determine min (|q|, p+2). That is, advantageously, corresponding binarizations are used and the above-presented binarizations B1 to B3 are examples for such binarizations in order to form corresponding sets 16.

Using such binarizations, the leading k, with k>=p+2, bins of bin strings 22 of the binarizations of the sequence of information values 10 may be sequentially coded/decoded in a first pass such as first pass 46 so that all relating to a current information value, or, to be more precise, all leading k bins of the current information value are decoded prior to any bin of a following information value of the sequence of information value, especially any of the leading k bins of such following information value. This had already been discussed above. In connection with dependent quantization, however, the following may hold true: the selection of the selected binarization out the set 16 of binarizations for a currently decoded bin of the currently decoded information value may be performed depending on minimum magnitude values of each of one or more information samples which correspond to a position in the block 26 of information samples which fulfils a predetermined locational relationship relative to a predetermined position to which the currently decoded information value corresponds, i.e., to a position within template 32. The minimum magnitude values had been described above and are determined based on the leading bins of the respective information sample previously decoded in the first pass, i.e., the bins up to the $k^{th}$ bin which are decoded/coded in the first pass. The dependency had been presented above exemplarily using sumAbs. That is, the minimum magnitude values may be subject to a summation, for instance.

In sequentially decoding/coding the leading k, with k>=p+2 bins of the bin strings of the binarizations of the sequence of information values 10 and the first pass, the sequentially decoding/coding may be done so that all bins relating to a current information value are decoded prior to any bin of a following information value of the sequence of information values. The parameter k may be selected for the currently decoded information value depending on the selected binarization for the currently decoded information value. For instance, for binarizations 1 and 2, k=4 and for binarization B3 k=3. This has also already been denoted above, i.e., the fact that the first pass 46 may only cover bins $30_1$ to $30_3$ for bin strings belonging to binarization B3, while bins $30_1$ to $30_4$ may be included in the first pass 46 as far as bin strings of the binarizations B1 and B2 are concerned.

Even further, for the currently decoded/coded information value, k may be selected depending on the selected binarization for the currently decoded information value in such a manner that the $k^{th}$ bin is, for all binarizations, indicative of the currently decoded/coded information value being greater than X or not greater than X with X being common for all binarizations. For instance, k may be chosen for binarizations B1, B2 and B3 as stated in the previous paragraph, and X may be p+3.

According to a particular embodiment, the selection of the selected binarization 14 out of the set 16 for a currently decoded/coded bin of the currently decoded/coded information value may be done depending on whether the sum of the minimum magnitude values of the neighboring one or more information samples of template 32 exceeds a predetermined threshold or not. This corresponds to the second alternative presented above in 2.1.

In connection with the dependent quantization, this predetermined threshold may be determined depending on the quantization state for the currently dequantized/quantized information value such as Thres [state].

The selection of the selected binarization out of the set of binarizations, i.e., the selection of binarization 14, for the currently decoded/coded information value may be performed depending on a predetermined position to which the currently decoded/coded information value corresponds, i.e., the positon within block 26. Compare, for instance, the third alternative in 1.1.

Even further, a predetermined bin of the bin string of the selected binarization 14 may be arithmetically decoded/coded based on a probability model selected out of a set of multiple probability models depending on one or more of the following: 1) whether the currently decoded/coded information value represents luma or chroma information, 2) depending on the position, the currently decoded/coded information value relates to inside the transform coefficient block 26, 3) depending on a function of a minimum magnitude value of one or more information values which correspond to a position in a block of information values which fulfil a predetermined locational relationship relative to a predetermined position to which the currently decoded/coded information value corresponds, i.e., template 32. The function may involve a summation and/or the function yields a difference between the sum of minimum magnitude values and the number of non-zero minimum magnitude values. Even further, additionally or alternatively, the selected probability model may additionally depend on the selected binarization and even further, additionally or alternatively, the selected probability model additionally depends on the state variable for dependent quantization.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] B. Bross, J. Chen, S. Liu (eds), "Versatile Video Coding (Draft 6), Joint Video Experts Teams, doc. JVET-O2001, July 2019.

The invention claimed is:

1. An apparatus for decoding a sequence of information values using binary arithmetic decoding, configured to, for a currently decoded information value,
   select a selected binarization out of a set of binarizations for the currently decoded information value depending on previously decoded information values, and arithmetically decode bins of a bin string of the selected binarization to acquire the currently decoded information value,
   wherein the information values are non-negative integers, and wherein the set of binarizations comprises
   a first binarization associating a first bin string of a first bin length with the currently decoded information value assuming zero, and a second bin string of a second bin length with the currently decoded information value assuming one, and
   a second binarization associating a third bin string of a third bin length with the currently decoded information value assuming zero, and a fourth bin string of a fourth bin length with the currently decoded information value assuming one, and
   wherein the first bin length is unequal to the third bin length or the second bin length is unequal to the fourth bin length.

2. The apparatus of claim 1, wherein the sequence of information values are
   quantization indexes for transform coefficients of a transform block, traversed along a scan order, or
   quantization indexes for sample values of a block of sample values, traversed along a scan order, or
   components of motion vector differences.

3. The apparatus of claim 1, wherein
   the first bin length is smaller than the second bin length and the third bin length is larger than the fourth bin length.

4. The apparatus of claim 3, wherein
   the first bin length equals the fourth bin length, and the second bin length equals the third bin length.

5. The apparatus of claim 3, wherein
   in all bin strings of the first binarization, a bin at a first bin position is indicative of the currently decoded information value being zero or non-zero, and
   in all bin strings of the second binarization, the bin at a first bin position is indicative of the currently decoded information value being equal to one or being unequal to one.

6. The apparatus of claim 5, configured to arithmetically decode the bin at the first bin position using a probability model selected depending on whether the bin at the first bin position is within the first or second binarization.

7. The apparatus of claim 5, configured to arithmetically decode the bin at the first bin position using a probability model selected by
   selecting the probability model to be used for arithmetically decoding the bin at the first bin position out of a set of probability models associated with the first bin position and the binarization the bin at the first bin position is part of depending on one or more of
   whether the information value the binarization of which the bin at the first bin position is part of represents luma or chroma information;
   a position of the information value, the binarization of which the bin at the first bin position is part of, inside a block of information values;
   a function of a minimum magnitude value of one or more information values, which correspond to positions in a block of information values which fulfill a predetermined locational relationship relative to a predetermined position of the information value the binarization of which the bin at the first bin position is part of, the minimum magnitude value being determined based on previously decoded bins of a binarization of the one or more information values.

8. The apparatus of claim 3, wherein
   in all bin strings of the first binarization with a bin length larger than one, and in all bin strings of the second binarization with a bin length larger than one, a bin at a second bin position is indicative of the currently decoded information value being greater than one or not being greater than one.

9. The apparatus of claim 8, configured to arithmetically decode the bin at the second bin position using a probability model selected depending on whether the bin at the second bin position is within the first or second binarization.

10. The apparatus of claim 8, configured to arithmetically decode the bin at the second bin position using a probability model selected by
   selecting a selected set of probability models out of sets of probability models depending on whether the bin at the second bin position is within the first or second binarization, and
   selecting the probability model to be used for arithmetically decoding the bin at the second bin position out of the selected set of probability models depending on one or more of
      whether the information value the binarization of which the bin at the second bin position is part of represents luma or chroma information;
      a position of the information value, the binarization of which the bin at the second bin position is part of, inside a block of information values;
      a function of a minimum magnitude value of one or more information values, which correspond to positions in a block of information values which fulfill a predetermined locational relationship relative to a predetermined position of the information value the binarization of which the bin at the second bin position is part of, the minimum magnitude value being determined based on previously decoded bins of a binarization of the one or more information values.

11. The apparatus of claim 3, wherein
in all bin strings of the first binarization with a bin length larger than two, and in all bin strings of the second binarization with a bin length larger than two, a bin at a third bin position is indicative of the currently decoded information value being even or odd.

12. The apparatus of claim 3, wherein
in all bin strings of the first binarization with a bin length larger than three, and in all bin strings of the second binarization with a bin length larger than three, a bin at a fourth bin position is indicative of the currently decoded information value being greater than three or not being greater than three.

13. The apparatus of claim 1, wherein
for integers x>1, the first binarization associates fifth bin strings of a fifth bin length with the currently decoded information value assuming x, and the second binarization associates sixth bin strings of a sixth bin length with the currently decoded information value assuming x, wherein the fifth bin length equals the sixth bin length.

14. The apparatus of claim 13, wherein
the fifth and sixth bin lengths are larger than a maximum of the first to fourth bin lengths, and
the fifth bin strings coincide with sixth bin strings at bin positions beyond the maximum of the first to fourth bin lengths.

15. The apparatus of claim 1, wherein
a maximum of the first to fourth bin lengths is two, and
for integers x>1, the first binarization associates fifth bin strings of a fifth bin length with the currently decoded information value assuming x, and the second binarization associates sixth bin strings of a sixth bin length with the currently decoded information value assuming x, wherein the fifth bin length and the sixth bin length are larger than two and differ by one.

16. The apparatus of claim 15, wherein
the first bin length is smaller than the third bin length with the sixth bin length being smaller than the fifth bin length, or
the second bin length is smaller than the fourth bin length with the sixth bin length being smaller than the fifth bin length.

17. The apparatus of claim 15, wherein
in all bin strings of the first binarization, a bin at a first bin position is indicative of the currently decoded information value being zero or non-zero, and
in all bin strings of the second binarization, a bin at a first bin position is indicative of the currently decoded information value being greater than one or not being greater than one.

18. The apparatus of claim 15, wherein
in all bin strings of the first binarization with a bin length larger than one, a bin at a second bin position is indicative of the currently decoded information value being greater than one or not being greater than one, and
in all bin strings of the second binarization with a bin length larger than one, a bin at a second bin position is indicative of the currently decoded information value being even or odd.

19. The apparatus of claim 15, wherein
in all bin strings of the first binarization with a bin length larger than two, a bin at a third bin position is indicative of the currently decoded information value being even or odd, and
in all bin strings of the second binarization with a bin length larger than two, a bin at a third bin position is indicative of the currently decoded information value being greater than three or not greater than three.

20. The apparatus of claim 15, wherein
in all bin strings of the first binarization with a bin length larger than three, a bin at a fourth bin position is indicative of the currently decoded information value being greater than three or not being greater than three.

21. The apparatus of claim 1, wherein
for integers x>N, the first binarization associates fifth bin strings with the currently decoded information value assuming x, and the second binarization associates sixth bin strings with the currently decoded information value assuming x, wherein the fifth bin strings and the sixth bin strings coincide in a run of trailing bins, and the apparatus is configured to arithmetically decode the trailing bins using an equi-probability bypass mode, and initial bins preceding the trailing bins context-adaptively, or
for integers x>N, the first binarization associates fifth bin strings with the currently decoded information value assuming x, and the second binarization associates sixth bin strings with the currently decoded information value assuming x, wherein the fifth bin strings and the sixth bin strings coincide in a run of a predetermined number of bins which extends from an end of the fifth and sixth bin strings beyond a run of trailing bins so as to also comprise one or more initial bins preceding the trailing bins, and the apparatus is configured to arithmetically decode the trailing bins using an equi-probability bypass mode, and initial bins preceding the trailing bins context-adaptively.

22. The apparatus of claim 21, configured to
arithmetically decode a bin of the first binarization at at least one predetermined bin position and a bin of the second binarization at the at least one predetermined bin position, using different probability models.

23. The apparatus of claim 21, configured to
arithmetically decode a bin of the first binarization at at least one predetermined bin position and a bin of the second binarization at at least one further predetermined bin position, using a common probability model.

24. The apparatus of 1, configured to
dequantize the sequence of information values using dependent quantization by
  selecting, for a currently dequantized information value, a selected information-value-to-reconstruction-level mapping out of a plurality of information-value-to-reconstruction-level mappings depending on a quantization state for the currently dequantized information value, and
  updating the quantization state for the currently dequantized information value depending on the currently dequantized information value, in order to acquire a quantization state for an information value to be subsequently dequantized, and
perform the selection of the selected binarization out of the set of binarizations for the currently decoded information value depending on the quantization state for the currently dequantized information value.

25. The apparatus of claim 24, wherein
the set of binarizations consists of a first binarization and a second binarization, the plurality of information-value-to-reconstruction-level mappings consists of a first information-value-to-reconstruction-level mapping and a second information-value-to-reconstruction-level mapping, and
the apparatus is configured to perform the selection of the selected binarization out of the set of binarizations for the currently decoded information value by selecting among the first and second binarizations depending on whether the selection of the selected information-value-to-reconstruction-level mapping depending on the quantization state for the currently dequantized information value yields the first or the second information-value-to-reconstruction-level mapping.

26. The apparatus of claim 1, wherein
the sequence of information values are ordered along a one-dimensional traversal of a block of information sample positions, and
the apparatus is configured to sequentially decode bins of bin strings of binarizations of the sequence of information values in one or more passes of the sequence of information values, and
perform the selection of the selected binarization out of the set of binarizations for a currently decoded bin of the currently decoded information value depending on one or more previously decoded bins of one or more information samples which correspond to a position in the block of information samples which fulfills a predetermined locational relationship relative to a predetermined position to which the currently decoded information value corresponds.

27. An apparatus for decoding a sequence of information values using binary arithmetic decoding, configured to, for a currently decoded information value,
  select a selected binarization out of a set of binarizations for the currently decoded information value depending on previously decoded information values, and
  arithmetically decode bins of a bin string of the selected binarization to acquire the currently decoded information value,
wherein the sequence of information values are ordered along a one-dimensional traversal of a block of information sample positions, and
wherein the apparatus is configured to
  sequentially decode bins of bin strings of binarizations of the sequence of information values in one or more passes of the sequence of information values, and
  perform the selection of the selected binarization out of the set of binarizations for a currently decoded bin of the currently decoded information value depending on one or more previously decoded bins of one or more information samples which correspond to a position in the block of information samples which fulfills a predetermined locational relationship relative to a predetermined position to which the currently decoded information value corresponds, and
wherein the information values are non-negative integers, and
wherein the apparatus is configured to use, in decoding the sequence of information samples, binarizations exclusively which, for integers x>p, associate with the currently decoded information value being x bin strings of a bin length which monotonically increases with x, and which is, at least if x>p+1, larger than p+1, and
wherein the apparatus is configured to sequentially decode leading k, with k>=p+2, bins of bin strings of binarizations of the sequence of information values in a first pass, and
wherein the apparatus is configured to perform the selection of the selected binarization out of the set of binarizations for a currently decoded bin of the currently decoded information value depending on minimum magnitude values of each of the one or more information samples which correspond to a position in the block of information samples which fulfills a predetermined locational relationship relative to a predetermined position to which the currently decoded information value corresponds, the minimum magnitude values being determined based on the leading bins of the respective information sample previously decoded in the first pass.

28. The apparatus of claim 27, wherein the apparatus is configured to sequentially decode the leading k, with k>=p+2, bins of the bin strings of the binarizations of the sequence of information values in the first pass so that all leading k bins relating to a current information value are decoded prior to any of the leading k bins of a following information value of the sequence of information values.

29. The apparatus of claim 27, wherein the apparatus is configured to select k for the currently decoded information value depending on the selected binarization for the currently decoded information value.

30. The apparatus of claim 29, wherein the apparatus is configured to select k for the currently decoded information value depending on the selected binarization for the currently decoded information value so that the $k^{th}$ bin is, for all binarizations, indicative of the currently decoded information value being greater than X or not greater than X with X being common for all binarizations.

31. The apparatus of claim 30, wherein X=p+3.

32. The apparatus of claim 31, wherein
the apparatus is configured to perform the selection of the selected binarization out of the set of binarizations for a currently decoded bin of the currently decoded information value depending on whether the sum of the minimum magnitude values of the one or more information samples, which correspond to positions in the block of information samples which fulfills a predetermined locational relationship relative to a predetermined position to which the currently decoded information value corresponds, exceeds a predetermined threshold or not.

33. The apparatus of claim 32, configured to
dequantize the sequence of information values using dependent quantization by
selecting, for a currently dequantized information value, a selected information-value-to-reconstruction-level mapping out of a plurality of information-value-to-reconstruction-level mappings depending on a quantization state for the currently dequantized information value, and
updating the quantization state for the currently dequantized information value depending on the currently dequantized information value, in order to acquire a quantization state for an information value to be subsequently dequantized, and
determine the predetermined threshold depending the quantization state for the currently dequantized information value.

34. The apparatus of claim 1, wherein
the sequence of information values are ordered along a one-dimensional traversal of a block of information sample positions, and
perform the selection of the selected binarization out of the set of binarizations for the currently decoded information value depending on a predetermined position to which the currently decoded information value corresponds.

35. The apparatus of claim 1, configured to
arithmetically decode a predetermined bin of the bin string of the selected binarization based on a probability model selected out of a set of multiple probability models depending on one or more of the following:
whether the currently decoded information value represents luma or chroma information;
position, the currently decoded information value relates to inside a transform coefficient block;
a function of a minimum magnitude value of one or more information values, which correspond to positions in a block of information values which fulfill a predetermined locational relationship relative to a predetermined position to which the currently decoded information value corresponds.

36. The apparatus of claim 35, wherein
the function involves a summation.

37. An apparatus for decoding a sequence of information values using binary arithmetic decoding, configured to, for a currently decoded information value,
select a selected binarization out of a set of binarizations for the currently decoded information value depending on previously decoded information values, and
arithmetically decode bins of a bin string of the selected binarization to acquire the currently decoded information value,
wherein the apparatus is configured to
arithmetically decode a predetermined bin of the bin string of the selected binarization based on a probability model selected out of a set of multiple probability models depending on one or more of the following:
whether the currently decoded information value represents luma or chroma information;
position, the currently decoded information value relates to inside a transform coefficient block;
a function of a minimum magnitude value of one or more information values, which correspond to positions in a block of information values which fulfill a predetermined locational relationship relative to a predetermined position to which the currently decoded information value corresponds, and
wherein the function yields a difference between the sum of the minimum magnitude values and the number of non-zero minimum magnitude values.

38. The apparatus of claim 37, wherein
the selected probability model additionally depends on the selected binarization.

39. The apparatus of claim 37, wherein
the selected probability model additionally depends on the quantization state variable.

40. An apparatus for encoding a sequence of information values using binary arithmetic coding, configured to, for a currently encoded information value,
select a selected binarization out of a set of binarizations for the currently encoded information value depending on previously encoded information values, and
arithmetically encode bins of a bin string of the currently encoded information value of the selected binarization,
wherein the information values are non-negative integers, and
wherein the set binarizations comprises
a first binarization associating a first bin string of a first bin length with the currently encoded information value assuming zero, and a second bin string of a second bin length with the currently encoded information value assuming one, and
a second binarization associating a third bin string of a third bin length with the currently encoded information value assuming zero, and a fourth bin string of a fourth bin length with the currently encoded information value assuming one, and
wherein the first bin length is unequal to the third bin length or the second bin length is unequal to the fourth bin length.

41. A method for decoding a sequence of information values using binary arithmetic decoding, comprising, for a currently decoded information value,
select a selected binarization out of a set of binarizations for the currently decoded information value depending on previously decoded information values, and
arithmetically decode bins of a bin string of the selected binarization to acquire the currently decoded information value,
wherein the information values are non-negative integers, and
wherein the set of binarizations comprises
a first binarization associating a first bin string of a first bin length with the currently decoded information value assuming zero, and a second bin string of a second bin length with the currently decoded information value assuming one, and
a second binarization associating a third bin string of a third bin length with the currently decoded information value assuming zero, and a fourth bin string of a fourth bin length with the currently decoded information value assuming one, and
wherein the first bin length is unequal to the third bin length or the second bin length is unequal to the fourth bin length.

42. A method for encoding a sequence of information values using binary arithmetic coding, comprising, for a currently encoded information value,
- select a selected binarization out of a set of binarizations for the currently encoded information value depending on previously encoded information values, and
- arithmetically encode bins of a bin string of the currently encoded information value of the selected binarization,
- wherein the information values are non-negative integers, and
- wherein the set binarizations comprises
    - a first binarization associating a first bin string of a first bin length with the currently encoded information value assuming zero, and a second bin string of a second bin length with the currently encoded information value assuming one, and
    - a second binarization associating a third bin string of a third bin length with the currently encoded information value assuming zero, and a fourth bin string of a fourth bin length with the currently encoded information value assuming one, and
- wherein the first bin length is unequal to the third bin length or the second bin length is unequal to the fourth bin length.

\* \* \* \* \*